United States Patent
Lee

(10) Patent No.: US 11,138,404 B2
(45) Date of Patent: Oct. 5, 2021

(54) COMPLEX SENSING DEVICE, DISPLAY DEVICE, AND SENSING METHOD

(71) Applicant: LG Display Co., Ltd., Seoul (KR)

(72) Inventor: JunHo Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 69 days.

(21) Appl. No.: 16/514,637

(22) Filed: Jul. 17, 2019

(65) Prior Publication Data
US 2020/0167537 A1 May 28, 2020

(30) Foreign Application Priority Data
Nov. 23, 2018 (KR) .................. 10-2018-0146375

(51) Int. Cl.
G06F 3/041 (2006.01)
G06F 3/044 (2006.01)
G06K 9/00 (2006.01)
G06F 21/32 (2013.01)

(52) U.S. Cl.
CPC .......... G06K 9/0002 (2013.01); G06F 3/044 (2013.01); G06F 21/32 (2013.01); G06F 2203/0338 (2013.01)

(58) Field of Classification Search
CPC ....... G06K 9/0002; G06F 3/044; G06F 21/32; G06F 2203/0338
See application file for complete search history.

(56) References Cited

U.S. PATENT DOCUMENTS

| | | | | |
|---|---|---|---|---|
| 4,424,465 A | * | 1/1984 | Ohigashi | B06B 1/0622 310/335 |
| 4,680,499 A | * | 7/1987 | Umemura | G10K 11/02 310/327 |
| 6,396,196 B1 | * | 5/2002 | Takeuchi | B32B 18/00 310/324 |
| 2010/0251823 A1 | * | 10/2010 | Adachi | A61B 8/12 73/606 |
| 2012/0262408 A1 | * | 10/2012 | Pasquero | G06F 3/0412 345/174 |
| 2013/0147741 A1 | * | 6/2013 | Low | G06F 3/041 345/173 |
| 2015/0331508 A1 | * | 11/2015 | Nho | G06F 3/0445 345/173 |
| 2015/0374335 A1 | * | 12/2015 | Brown | G01S 15/8993 600/447 |
| 2016/0162101 A1 | * | 6/2016 | Pant | G06F 1/3215 345/174 |
| 2017/0076130 A1 | * | 3/2017 | Kravets | G06K 9/0008 |
| 2017/0097702 A1 | * | 4/2017 | Chang | G06K 9/0002 |
| 2017/0316250 A1 | * | 11/2017 | Roh | G06F 3/0488 |

(Continued)

Primary Examiner — Antonio Xavier
(74) Attorney, Agent, or Firm — Fenwick & West LLP

(57) ABSTRACT

The present disclosure relates to a display device and a sensing method, and more specifically, to a complex sensing device, a display device and a sensing method comprising: a touch panel on which a plurality of touch electrodes is disposed, a fingerprint panel on which a plurality of pixels is disposed, a touch circuit sensing the touch panel and outputting first sensing data, a fingerprint circuit sensing a fingerprint sensing area of the fingerprint panel and outputting second sensing data, and a sensing controller setting the fingerprint sensing area for enabling the fingerprint circuit to sense the fingerprint panel based on the first sensing data of the touch circuit.

24 Claims, 37 Drawing Sheets

(56) References Cited

U.S. PATENT DOCUMENTS

| | | | | |
|---|---|---|---|---|
| 2018/0136772 A1* | 5/2018 | Wang | ................... | G09F 9/372 |
| 2019/0294845 A1* | 9/2019 | De Foras | ............. | G06K 9/0002 |
| 2020/0160025 A1* | 5/2020 | Dangy-Caye | ...... | G06K 9/00087 |
| 2020/0167026 A1* | 5/2020 | Lee | ................... | G06F 3/0412 |

* cited by examiner

COMPLEX SENSING DEVICE, DISPLAY DEVICE, AND SENSING METHOD

CROSS-REFERENCE TO RELATED APPLICATION

This application claims the priority benefit of Korean Patent Application No. 10-2018-0146375, filed on Nov. 23, 2018 in the Korean Intellectual Property Office, the disclosure of which is incorporated herein by reference in its entirety.

BACKGROUND

Field of the Disclosure

The present disclosure relates to a complex sensing device, a display device and a sensing method.

Description of the Background

As the information-oriented society has been developed, various needs for display devices for displaying an image have increased. Recently, various types of display devices, such as Liquid Crystal Display (LCD), Plasma Display Panel (PDP), and Organic Light Emitting Display (OLED) devices, have been developed and utilized.

In addition, in order to provide various application functions to a user, there are growing needs for the display devices to perform a function of sensing a touch of the user and a function of sensing a fingerprint of the user.

However, in order to provide the fingerprint sensing function, not only may an additional configuration be used, but an additional signal supply for sensing the fingerprint may be used. Since signals for sensing the fingerprint may use relatively a high voltage, there is therefore a problem that power consumption increases.

Accordingly, the increase in power consumption may become a major hindrance to the inclusion of a fingerprint sensor into a battery-operated mobile terminal or a battery-operated portable device. The increase in power consumption caused by implementation of the fingerprint sensing can be a major factor that makes it difficult to use a large area fingerprint sensor.

SUMMARY

Accordingly, the present disclosure is directed to complex sensing devices, display devices and sensing methods that substantially obviate one or more problems due to limitations and disadvantages of the prior art. Additional features and advantages of the disclosure will be set forth in the description which follows and in part will be apparent from the description, or may be learned by practice of the disclosure. The objects and other advantages of the disclosure will be realized and attained by the structure particularly pointed out in the written description and claims hereof as well as the appended drawings.

It is one object of the present disclosure to enable fingerprint sensing to be performed with low power consumption.

It is another object of the present disclosure to enable fingerprint sensing to be performed in a large area fingerprint sensor.

It is further another object of the present disclosure to enable fingerprint sensing to be performed in various locations.

It is yet another object of the present disclosure to enable fingerprint sensing to be performed by locally scanning only a part of an area of a fingerprint panel.

It is yet another object of the present disclosure to provide complex sensing devices, display devices and sensing methods for enabling a fingerprint sensor to sense a fingerprint with low power consumption using a touch sensor.

In accordance with one aspect of the present disclosure, a complex sensing device is provided that includes: a touch panel on which a plurality of touch electrodes is disposed, a fingerprint panel on which a plurality of pixels is disposed, a touch circuit sensing the touch panel and outputting first sensing data, a fingerprint circuit sensing a fingerprint sensing area of the fingerprint panel and outputting second sensing data, and a sensing controller setting the fingerprint sensing area based on the first sensing data of the touch circuit.

The sensing controller can determine a touch location based on the first sensing data, and set a part of an area of the fingerprint panel as the fingerprint sensing area based on the touch location.

At least one of the panels included in the fingerprint sensing area can be selected as a sensing pixel, and at least one pixel adjacent to the sensing pixel can be selected as a driving pixel. The fingerprint circuit can supply a driving signal to the driving pixel and sense the sensing pixel.

As a driving signal is supplied to the driving pixel, ultrasonic waves are generated from the driving pixel. The ultrasonic waves reflected from a fingerprint after having been generated from the driving pixel can be received by the sensing pixel.

Each of the plurality of pixels disposed in the fingerprint panel can include: a transducer including a first driving electrode, a piezoelectric material layer, and a second driving electrode, a transmission transistor controlled by a first scan signal, and electrically connected between a driving line to which a first driving signal is supplied and the first driving electrode, and a first reception transistor and a second reception transistor electrically connected between a readout line and a power supply line to which a power supply voltage is supplied.

The first reception transistor can be electrically connected between the power supply line and an intermediate node corresponding to a connection point between the first transistor and the second transistor. The second reception transistor can be controlled according to the second scan signal, and be electrically connected between the intermediate node and the readout line.

The transducer included in the driving pixel can generate ultrasonic waves when the first driving signal is applied to the first driving electrode and a bias voltage is applied to the second driving electrode. The transducer included in the sensing pixel can cause a voltage of the first driving electrode to be changed according to ultrasonic waves reflected from the fingerprint after having been generated from the driving pixel.

The piezoelectric material layer can be in the form of a plate, and be disposed commonly in the whole area of the plurality of pixels. For example, the piezoelectric material layer can be disposed to be spread over the whole area of the pixels.

The piezoelectric material layer can be divided into portions corresponding to sizes of respective areas of the plurality of pixels.

In the piezoelectric material layer, one or more portions (e.g., two or more portions) of the divided portions corresponding to sizes of respective areas of the plurality of pixels can be mapped to the fingerprint sensing area.

A plurality of touch sensor units can be defined by the plurality of touch electrodes, and a plurality of fingerprint sensor units can correspond to the plurality of pixels.

The sensing controller can select one or more touch sensor units of the plurality of touch sensor units based on the first sensing data, select one or more fingerprint sensor units, which overlap at least a part of an area over which the one or more selected touch sensor units are spread, of the fingerprint sensor units, and set a fingerprint sensing area including the one or more selected fingerprint sensor units.

A size of each of the plurality of touch sensor units can correspond to a size of each of the plurality of fingerprint sensor units.

A size of each of the plurality of touch sensor units can be larger or smaller than, or equal to, a size of each of the plurality of fingerprint sensor units.

A direction in which the touch panel is scanned can be equal to, or different from, a direction in which the fingerprint sensing area is scanned in the fingerprint panel.

The sensing controller may set two or more fingerprint sensing areas each having a different location from another based on the first sensing data of the touch circuit.

In accordance with another aspect of the present disclosure, a method is provided for sensing a complex sensing device including a touch panel and a fingerprint panel.

The sensing method of the complex sensing device can include sensing the touch panel, setting a fingerprint sensing area corresponding to an area of the fingerprint panel based on a result obtained from the sensing the touch panel, and sensing locally the fingerprint area of the fingerprint panel.

In accordance with further another aspect of the present disclosure, a display device is provided that includes: a display panel, a touch panel including a plurality of touch electrodes, a fingerprint panel including a plurality of pixels, a touch circuit sensing the touch panel and outputting first sensing data, a fingerprint circuit sensing a fingerprint sensing area of the fingerprint panel and outputting second sensing data, and a sensing controller setting the fingerprint sensing area for enabling the fingerprint circuit to sense the fingerprint panel based on the first sensing data of the touch circuit.

In accordance with another aspect of the present disclosure, an apparatus is provided that includes: a touch panel including a plurality of touch electrodes defining an area of the touch panel; a touch circuit configured to sense the touch panel; a fingerprint panel including a plurality of pixels defining an area of the fingerprint panel, the area of the fingerprint panel overlapping the area of the touch panel; and a fingerprint circuit configured to sense a subset of the plurality of the pixels of the fingerprint panel corresponding to a fingerprint sensing area that is smaller than the area of the fingerprint panel.

The touch circuit may output touch sensing data, and the fingerprint circuit may provide a driving signal to a first pixel in the fingerprint sensing area. The fingerprint circuit may provide a first scan signal to the first pixel in the fingerprint sensing area, the first pixel generating ultrasonic waves corresponding to the driving signal. The fingerprint circuit may provide the first scan signal to a second pixel in the fingerprint sensing area, the second pixel sensing ultrasonic waves that are the generated ultrasonic waves from the first pixel reflected from a fingerprint of a finger.

A sensing controller may be electrically coupled to the touch circuit and the fingerprint circuit. The sensing controller may receive touch sensing data from the touch circuit, and may cause the fingerprint circuit to: provide a driving signal to a first pixel in the fingerprint sensing area, and provide a first scan signal to both the first pixel and a second pixel in the fingerprint sensing area, the first pixel generating ultrasonic waves corresponding to the driving signal, and the second pixel sensing ultrasonic waves that are the generated ultrasonic waves from the first pixel reflected from a fingerprint of a finger.

In accordance with embodiments of the present disclosure, it is possible to perform fingerprint sensing with low power consumption.

In accordance with embodiments of the present disclosure, it is possible to perform fingerprint sensing in a large sensing area.

In accordance with embodiments of the present disclosure, it is possible to perform fingerprint sensing in various locations.

In accordance with embodiments of the present disclosure, it is possible to perform fingerprint sensing by locally scanning only a part of the whole areas of a fingerprint panel.

In accordance with embodiments of the present disclosure, it is possible to provide complex sensing devices, display devices and sensing methods for enabling a fingerprint sensor to sense a fingerprint with low power consumption using a touch sensor.

DETAILED DESCRIPTION

Figure 1:
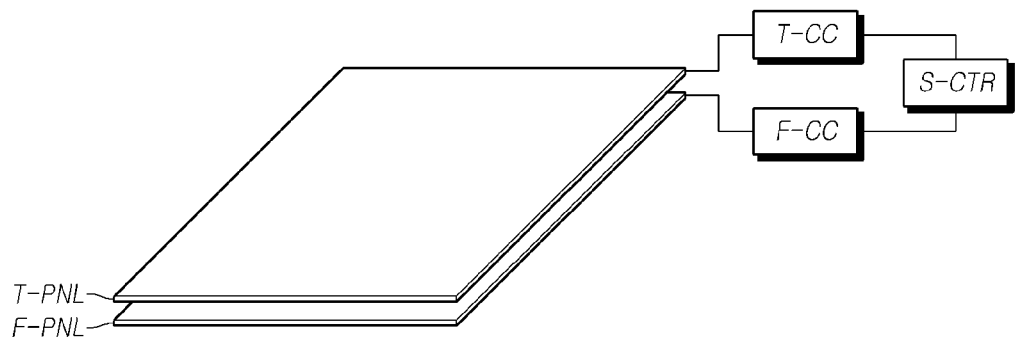
FIG. 1 is a diagram schematically illustrating a complex sensing device according to embodiments of the present disclosure.

The advantages and features of the present disclosure and methods of achieving the same will be apparent by referring to aspects of the present disclosure as described below in detail in conjunction with the accompanying drawings. However, the present disclosure is not limited to the aspects set forth below, but may be implemented in various different forms. The following aspects are provided only to completely disclose the present disclosure and inform those skilled in the art of the scope of the present disclosure, and the present disclosure is defined only by the scope of the appended claims.

In addition, the shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description of the present disclosure, detailed description of well-known functions and configurations incorporated herein will be omitted when it is determined that the description may make the subject matter in some embodiments of the present disclosure rather unclear. The terms such as "including", "having", "containing", "comprising of", and "consist of" used herein are generally intended to allow other components to be added unless the terms are used with the term "only". As used herein, singular forms are intended to include plural forms unless the context clearly indicates otherwise.

In interpreting any elements or features of the embodiments of the present disclosure, it should be considered that any dimensions and relative sizes of layers, areas and regions include a tolerance or error range even when a specific description is not conducted.

Terms, such as first, second, A, B, (A), or (B) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element. Spatially relative terms, such as, "on", "over", "above", "below", "under", "beneath", "lower", "upper", "near", "close", "adjacent", and the like, may be used herein to describe one element or feature's relationship to another element(s) or feature(s) as illustrated in the figures, and it should be interpreted that one or more elements may be further "interposed" between the elements unless the terms such as "directly", "only" are used.

Any elements or features of the embodiments of the present disclosure are not limited to a specific meaning of the terms described above. The terms as used herein are merely for the purpose of describing examples and are not intended to limit the present disclosure. Although the terms "first", "second", and the like are used for describing various elements, or features, these elements are not confined by these terms. These terms are merely used for distinguishing one element from other elements. Therefore, a first element to be mentioned below may be a second element in a technical concept of the present disclosure.

The elements or features of various exemplary embodiments of the present disclosure can be partially or entirely bonded to or combined with each other and can be interlocked and operated in technically various ways as can be fully understood by a person having ordinary skill in the art, and the various exemplary embodiments can be carried out independently of or in association with each other.

Hereinafter, exemplary embodiments of the present disclosure will be described in detail with reference to the accompanying drawings.

Figure 2:
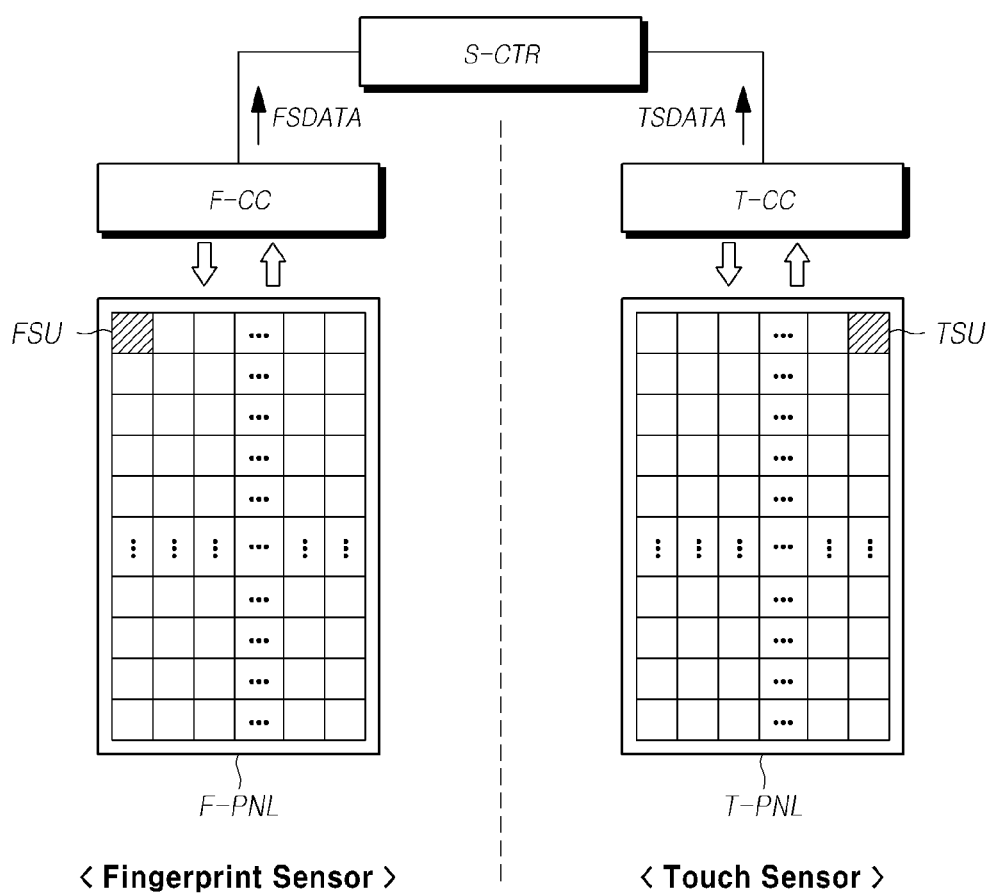
FIG. 2 is a diagram illustrating two types of sensors constituting the complex sensing device according to embodiments of the present disclosure.

FIG. 1 is a diagram schematically illustrating a complex sensing device 100 according to embodiments of the present disclosure. FIG. 2 is a diagram illustrating two types of sensors constituting the complex sensing device 100 according to embodiments of the present disclosure.

Referring to FIGS. 1 and 2, the complex sensing device 100 in accordance with embodiments of the present disclosure includes a touch sensor, a fingerprint sensor and a sensing controller S-CTR.

The touch sensor can include a touch panel T-PNL, a touch circuit T-CC for sensing the touch panel T-PNL, or the like.

The fingerprint sensor can include a fingerprint panel F-PNL, a fingerprint circuit F-CC for sensing the fingerprint panel F-PNL, or the like. The sensing controller S-CTR can control the touch circuit T-CC and the fingerprint circuit F-CC. The sensing controller S-CTR may be electrically coupled to the touch circuit T-CC and the fingerprint circuit F-CC.

The sensing controller S-CTR can control an operation timing of each of the touch circuit T-CC and the fingerprint circuit F-CC, and control a timing of each of a touch sensing process and a fingerprint sensing process.

The sensing controller S-CTR can receive first sensing data TSDATA corresponding to a result of touch sensing from the touch circuit T-CC, and calculate the presence or the absence of a touch and/or the location of a touch (touch coordinates).

The sensing controller S-CTR can receive second sensing data FSDATA corresponding to a result of fingerprint sensing from the fingerprint circuit F-CC, and recognize (detect) a fingerprint.

The touch panel T-PNL can include a plurality of touch sensor units. Here, the touch sensor unit TSU is a basic configuration unit for constituting the touch sensor.

The touch circuit T-CC can obtain first sensing data TSDATA by sensing at least one of the plurality of touch sensor units TSU, and supply the obtained data to the sensing controller S-CTR. The sensing controller S-CTR can calculate the presence or the absence of a touch and/or the location of a touch using the first sensing data TSDATA.

The fingerprint panel F-PNL can include a plurality of fingerprint sensor units. Here, the fingerprint sensor unit FSU is a basic configuration unit for constituting the fingerprint sensor.

The fingerprint circuit F-CC can obtain second sensing data FSDATA by sensing at least one of the plurality of fingerprint sensor units FSU, and supply the obtained data to the sensing controller S-CTR. The sensing controller S-CTR can recognize (detect) a corresponding fingerprint using the second sensing data FSDATA.

For convenience of explanation, as illustrated in FIGS. 1 and 2, it is considered that the touch panel T-PNL has the same size as the fingerprint panel F-PNL, but embodiments of the present disclosure are not limited thereto. For example, the touch panel T-PNL may have a different size from the fingerprint panel F-PNL. In some embodiments, the fingerprint panel F-PNL may have a smaller size than the touch panel T-PNL.

The touch panel T-PNL and the fingerprint panel F-PNL may be separate panels, such as, being manufactured separately, or sub-panels which are integrated or combined into one panel.

Figure 3:
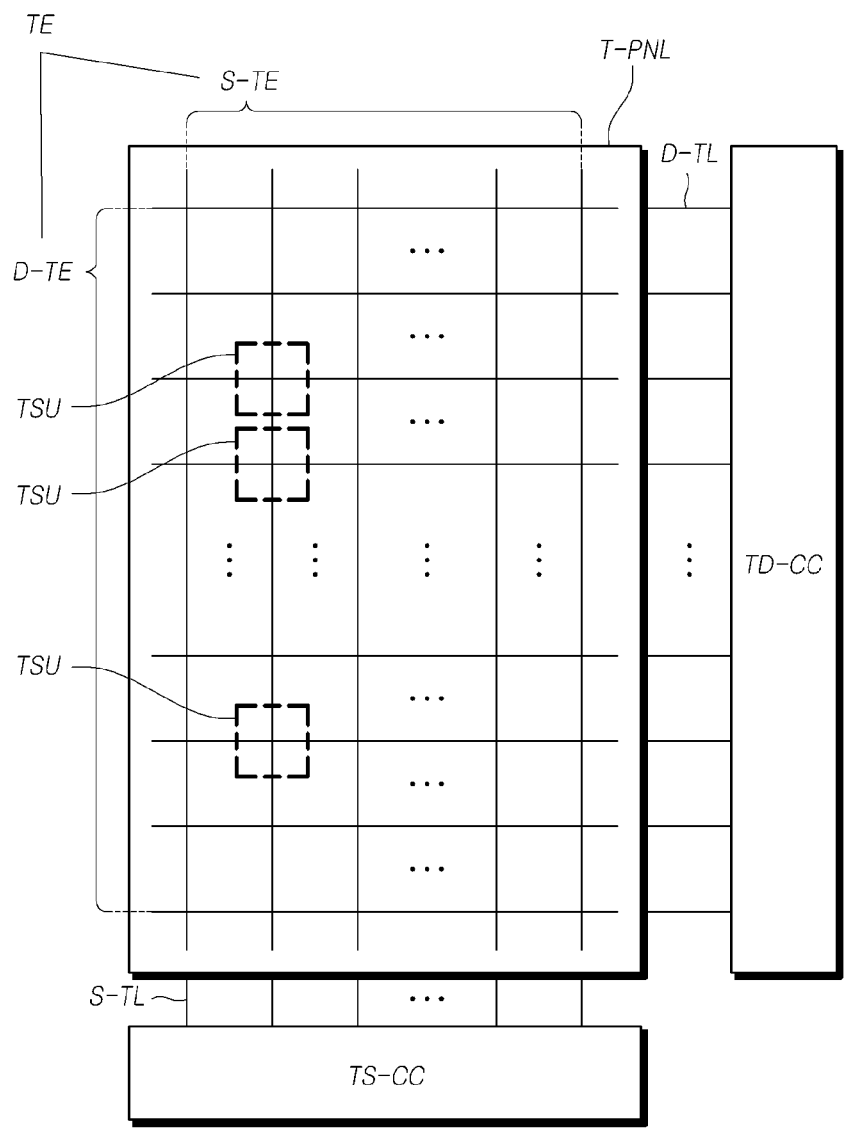
FIGS. 3, 4, and 5 are diagrams illustrating a touch sensor of the complex sensing device according to embodiments of the present disclosure.
Figure 4:
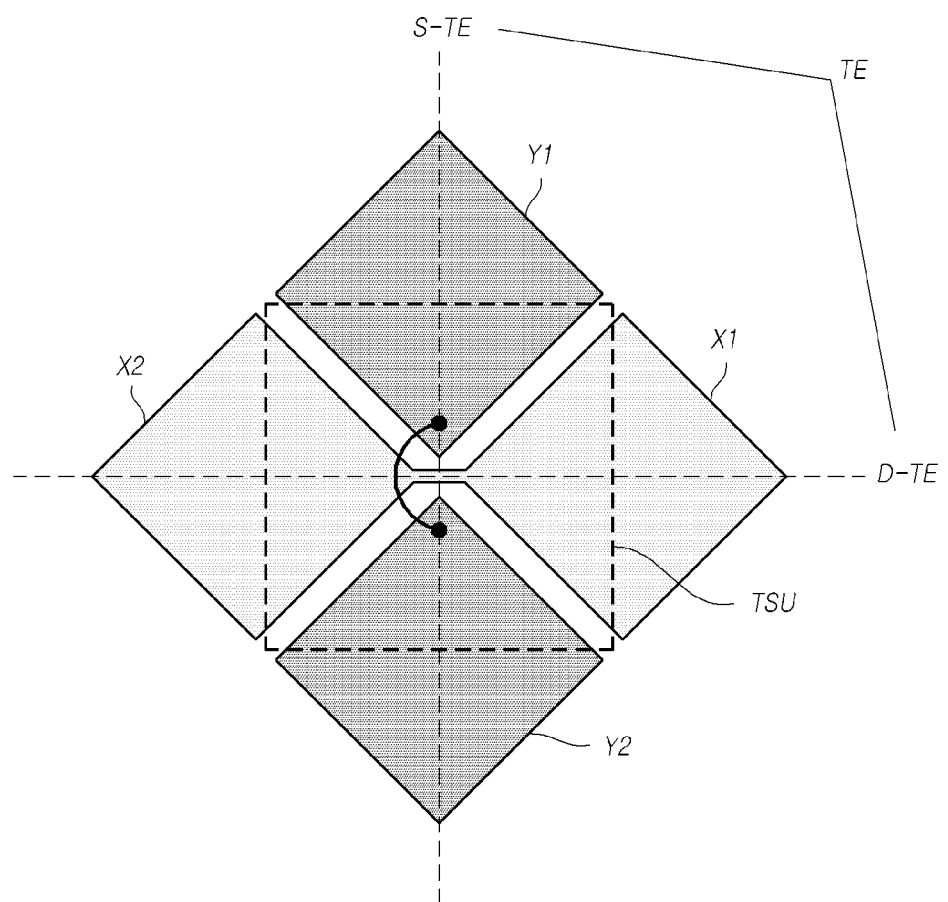
Figure 5:
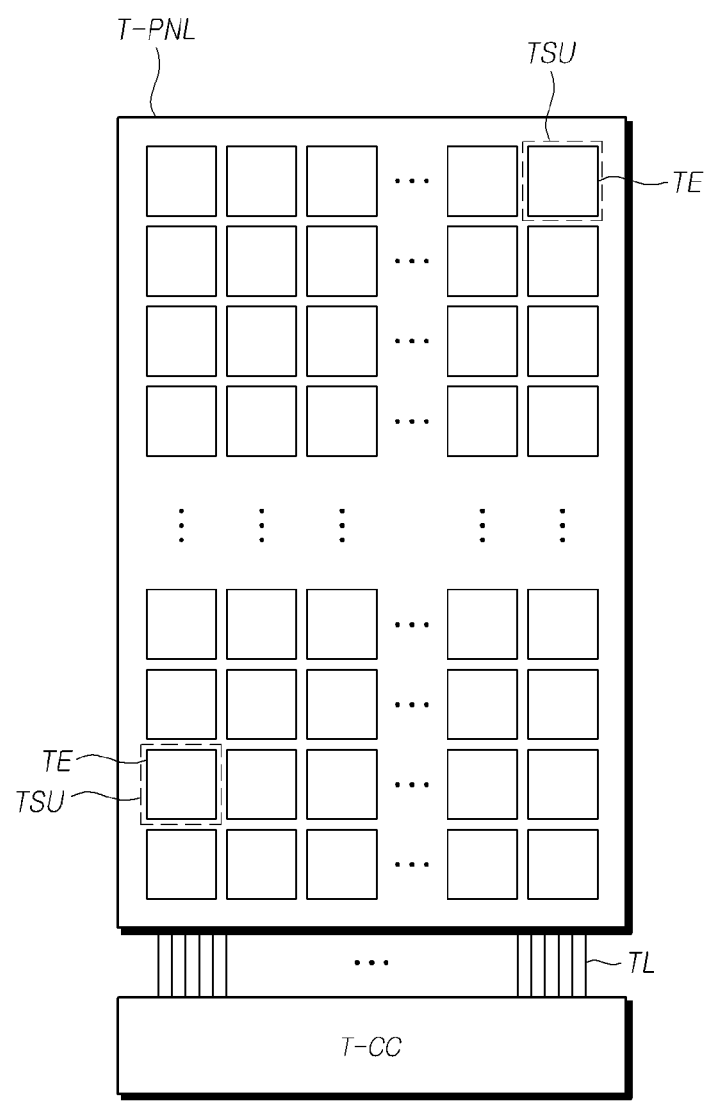

FIGS. 3 to 5 are diagrams illustrating a touch sensor of the complex sensing device 100 according to embodiments of the present disclosure.

Referring to FIG. 3, a touch sensor of the complex sensing device 100 in accordance with embodiments of the present disclosure can include a touch panel T-PNL configured with shapes, and/or depositions etc. of touch electrodes D-TE and S-TE for sensing a mutual capacitance based touch, and a touch circuit T-CC driving and sensing touch panel T-PNL.

A plurality of touch electrodes TE can be disposed on the touch panel T-PNL. The plurality of touch electrodes TE may define an area of the touch panel T-PNL.

The touch panel T-PNL may be a panel for sensing a mutual capacitance based touch. The plurality of touch electrodes TE disposed on the touch panel T-PNL can be divided into one or more driving touch electrodes D-TE to which a touch driving signal is applied and one or more sensing touch electrodes S-TE for detecting a touch sensing signal.

A mutual capacitance is formed between the driving touch electrode D-TE and the sensing touch electrode S-TE.

The touch circuit T-CC can include a touch driving circuit TD-CC that supplies a touch driving signal to one or more of a plurality of driving touch electrodes D-TE disposed on the touch panel T-PNL, and a touch sensing circuit TS-CC that receives a touch sensing signal from one or more of a plurality of sensing touch electrodes disposed on the touch panel T-PNL. The touch sensing signal is a signal detected from a mutual capacitance formed by each sensing touch electrode S-TE with respect to adjacent driving touch electrodes D-TE.

A plurality of driving touch lines D-TL can be disposed on the touch panel T-PNL to connect electrically between each of the plurality of driving touch electrodes D-TE and the touch driving circuit TD-CC. A plurality of sensing touch lines S-TL can be disposed on the touch panel T-PNL to connect electrically between each of the plurality of sensing touch electrodes S-TE and the touch sensing circuit TS-CC.

An area in which the driving touch electrode and the sensing touch electrode intersect on the touch panel T-PNL can be referred to as a touch sensor unit TSU.

In FIG. 3, the plurality of driving touch electrodes D-TE and the plurality of sensing touch electrodes S-TE are shown in the form of an equivalent circuit. Here, one driving touch electrode D-TE may be one electrode in the form of a line or a bar, or be a form in which a plurality of electrodes are electrically connected to one another. Further, one sensing touch electrode S-TE may be one electrode in the form of a line or a bar, or be a form in which a plurality of electrodes is electrically connected to one another.

For example, as shown in FIG. 4, the driving touch electrode D-TE may be a form in which small electrodes (X1, X2, . . . ) having a rhombus shape are electrically connected to one another. The sensing touch electrode S-TE may be a form in which small electrodes (Y1, Y2, . . . ) having a rhombus shape are electrically connected to one another. An area in which the driving touch electrode D-TE and the sensing touch electrode S-TE intersect can correspond to a touch sensor unit TSU that acts as a basic element of the touch sensor.

As shown in FIGS. 3 and 4, when it is satisfied a condition in which each of the plurality of driving touch electrode D-TE and each of the plurality of sensing touch electrode S-TE intersect, each of driving touch electrode D-TE and each of the sensing touch electrode S-TE may have a variety of shapes and be disposed in a variety forms.

Referring to FIG. 5, a touch sensor of the complex sensing device 100 in accordance with embodiments of the present disclosure can include a touch panel T-PNL configured with shapes, and/or depositions etc. of touch electrodes D-TE and S-TE for sensing a self-capacitance based touch, and a touch circuit T-CC driving and sensing touch panel T-PNL.

A plurality of touch electrodes TE can be disposed on the touch panel T-PNL. A touch driving signal can be applied to each of the touch electrodes TE and a touch sensing signal can be detected from each of the touch electrodes TE. A self-capacitance is formed in each of the touch electrodes TE.

The touch circuit T-CC can supply a touch driving signal to one or more of the plurality of touch electrodes TE disposed on the touch panel T-PNL, and then detect a touch sensing signal. Here, the touch sensing signal is a signal detected depending on a self-capacitance of each touch electrode TE.

When supplying a touch driving signal to one or more of the plurality of touch electrodes TE disposed on the touch panel T-PNL, the touch circuit T-CC can supply a load-free driving signal to one or more adjacent touch electrodes TE.

The load-free driving signal is a signal for preventing a parasitic capacitance between a touch electrode TE from which a touch is sensed and each of other adjacent touch electrodes TE from being formed, and can be a signal similar or equal to a frequency, a phase, and an amplitude of the touch driving signal.

In the case of a touch panel integrated display panel, when touch driving is performed, the load-free driving signal may be applied to display driving patterns (e.g., data lines, gate lines, etc.) disposed on the display panel.

A plurality of signal lines TL can be disposed to connect electrically each of the plurality of touch electrodes TE to the touch circuit T-CC in the touch panel T-PNL.

As shown in FIG. 5, in the self-capacitance based touch panel T-PNL, one touch electrode TE can correspond to a touch sensor unit TSU that acts as a basic element of the touch sensor.

It should be noted that the touch electrode TE illustrated in FIG. 5 is merely one example of a type of touch electrode, but embodiments of the present disclosure are not limited thereto. The touch electrode TE may have various shapes or be disposed in various forms.

Further, one touch electrode TE can be an electrode in the form of a plate without an opening, or an electrode with one or more openings in a mesh form. One touch electrode TE may be transparent electrode or an opaque electrode.

In the case of the touch panel integrated display panel, the plurality of touch electrodes TE can be utilized as a common electrode for driving the display panel or the display device.

Figure 6:
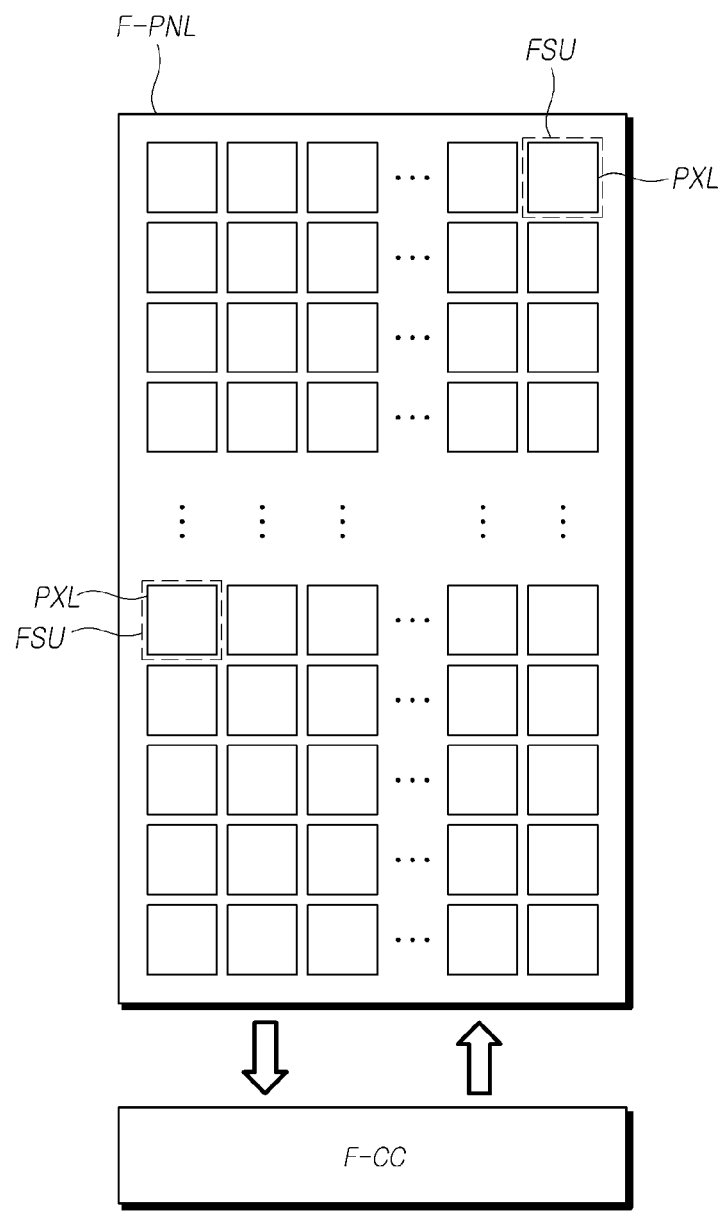
FIG. 6 is a diagram illustrating a fingerprint sensor of the complex sensing device according to embodiments of the present disclosure.

FIG. 6 is a diagram illustrating a fingerprint sensor of the complex sensing device 100 according to embodiments of the present disclosure.

Referring to FIG. 6, a fingerprint sensor of the complex sensing device 100 in accordance with embodiments of the present disclosure can include a fingerprint panel F-PNL and a fingerprint circuit F-CC etc.

A plurality of pixels PXL can be disposed on the fingerprint panel F-PNL. Each of the pixels PXL can be a fingerprint sensor unit FSU that acts as a basic element of the fingerprint sensor. The plurality of pixels PXL may define an area of the fingerprint panel F-PNL.

The fingerprint circuit F-CC can drive and sense the fingerprint panel F-PNL. That is, the fingerprint circuit F-CC drives one or more pixels PXL and senses one or more pixels.

The fingerprint circuit F-CC can drive one or more pixels by supplying a driving signal to one or more pixels PXL, and sense one or more pixels by detecting a sensing signal from one or more pixels PXL.

The fingerprint circuit F-CC can recognize a fingerprint based on sensing signals detected from one or more pixels PXL.

Figure 7:
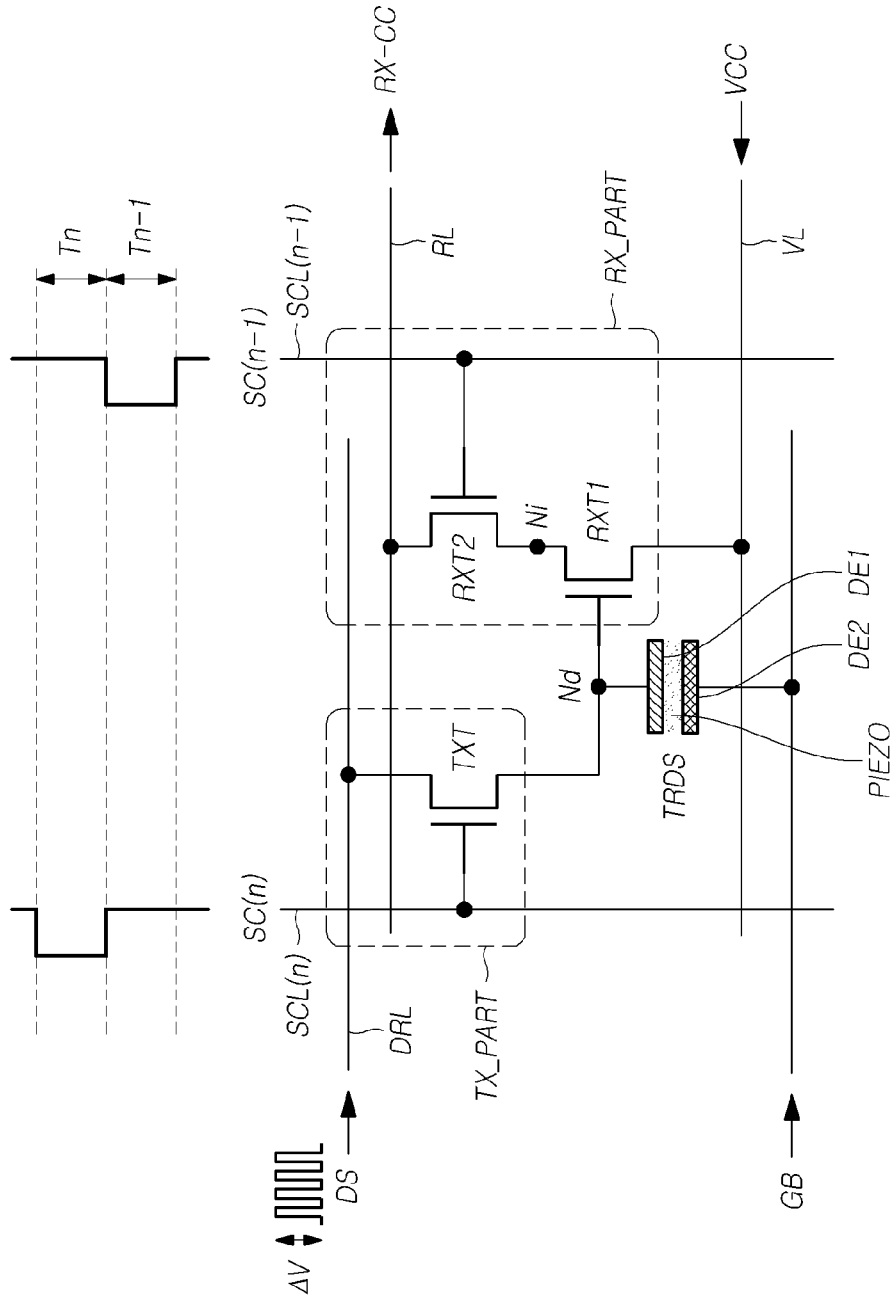
FIG. 7 is a diagram schematically illustrating a pixel structure of a fingerprint panel of the complex sensing device according to embodiments of the present disclosure.

FIG. 7 is a diagram schematically illustrating a pixel structure of the complex sensing device 100 according to embodiments of the present disclosure.

Referring to FIG. 7, a pixel PXL disposed on the fingerprint panel F-PNL of the complex sensing device 100 can include a transducer TRDS including a first driving electrode DE1, a piezoelectric material layer PIEZO and a second driving electrode DE2, a transmission portion TX-PART that operates in a driving mode (or a transmission mode), and that enables a driving signal DS to be transmitted to the first driving electrode DE1 of the transducer TRDS, a reception portion RX-PART that operates in a sensing mode (or a reception mode), and that enables a readout circuit RX-CC to detect an electrical signal (or a sensing signal) through a readout line, and the like. The terms "driving" may be used as an equal meaning to "transmission TX," or may be used as an equal meaning to "reception RX."

As described above, the transducer TRDS can include the first driving electrode DE1, the piezoelectric material layer PIEZO and the second driving electrode DE2.

A driving signal DS can be applied to the first driving electrode DE1 of the transducer TRDS through the transmission portion TX-PART. The first driving electrode DE1 or a point (a pattern, an electrode, etc.) with an electrical characteristic similar or identical thereto may be referred to as a driving node Nd. A bias voltage GB can be applied to the second driving electrode DE2.

A driving signal DS applied to the first driving electrode DE1 can be, e.g., a signal with a certain amplitude ($\Delta V$) and a variable voltage level, or in the form of an AC signal (may be referred to as a pulse signal or a modulated signal). The driving signal DS may have various waveforms such as a square wave, a sine wave, a triangle wave, and the like.

The driving signal DS can be a signal supplied to one or more pixels (one or more driving pixels) to be driven among the plurality of pixels PXL.

Herein, a signal supplied to the second driving electrode DE2 is referred to as a bias voltage GB. The bias voltage GB is a different signal from the driving signal DS supplied to the first driving electrode DE1, can be a DC voltage. The bias voltage GB can be a DC voltage with a low voltage level.

When the driving signal DS with a pre-configured frequency in the form of an AC signal is applied to the first driving electrode DE1, and the bias voltage GB with a low voltage level is applied to the second driving electrode DE2, the piezoelectric material layer PIEZO can vibrate to generate a signal. For example, a signal generated from the transducer TRDS may be an electromagnetic wave, an ultrasonic wave, a sound wave, or the like.

Here, when a sound wave is generated from the transducer TRDS, the sound wave may have a range of approximately 16 Hz to 20 KHz. When the ultrasonic wave is generated from the transducer TRDS, the ultrasonic wave may have, e.g., frequencies above 20 KHz. That is, the ultrasonic wave generated from the transducer TRDS may have a period less than or equal to 50 µsec.

The piezoelectric material layer PIEZO can be formed of ZnO (zinc oxide), perovskite, etc., but not limited thereto. The piezoelectric material layer PIEZO may be formed of various piezoelectric materials.

Hereinafter, for convenience of description, it is considered that signals generated from the transducer TRDS are ultrasonic waves.

The transducer TRDS converts electrical energy into a different type of energy, resulting in a corresponding signal being generated, and convert a received signal into electrical energy, resulting in a corresponding signal being generated. That is, the transducer TRDS can be an energy conversion device and a signal generating device. For example, the transducer TRDS may be an ultrasonic wave transducer that generates ultrasonic waves depending on electrical energy applied to the first driving electrode DE1, and generates electrical energy when ultrasonic waves are received.

More specifically, in the transducer TRDS, when a driving signal DS in the form of an AC signal is applied to the first driving electrode DE1, and a bias voltage with a low DC voltage level is applied to the second driving electrode DE2, the piezoelectric material layer PIEZO vibrates and converts electrical energy by voltages DS and GB applied to the first and second driving electrodes DE1 and DE2 to ultrasonic waves, resulting in the ultrasonic waves being generated. Here, the vibration of the piezoelectric material layer PIEZO can mean that the polarization state of the piezoelectric material layer PIEZO is changed.

In the transducer TRDS, when ultrasonic waves are received by the piezoelectric material layer TRDS, the piezoelectric material layer PIEZO vibrates, and a voltage obtained from the conversion of ultrasonic waves into electrical energy is generated from the first driving electrode DE1 Here, the vibration of the piezoelectric material layer PIEZO can mean that the polarization state of the piezoelectric material layer PIEZO is changed.

The transmission portion TX-PART is a circuit portion that enables the transducer TRDS to generate a signal (an ultrasonic wave) in the driving mode (transmission mode).

The transmission portion TX-PART is controlled by a first scan signal SC(n) supplied through a first scan line SCL(n), and can include a transmission transistor TXT electrically connected between the first driving electrode DE1 and a driving line to which a driving signal DS with a variable voltage level is supplied. Hereinafter, taking into a scanning order account, the first scan line and the first scan signal are referred to as an n-th scan line SCL(n) and an n-th scan signal SC(n), respectively.

On-off operations of the transmission portion TX-PART can be controlled by the n-th scan signal SC(n) supplied through the n-th scan line SCL(n).

The transmission portion TX-PART can be turned on by the n-th scan signal (SC(n)), and transfer a driving signal DS supplied through the driving line DRL to the first driving electrode DE1 of the transducer TRDS.

The reception portion RX-PART is a circuit portion that enables a signal to be detected through the readout line RL in the sensing mode (reception mode).

The reception portion RX-PART can include a first reception transistor RXT1 and a second reception transistor RXT2 which are connected between the readout line RL and a power supply line VL. Here, the power supply line VL is a line to which a power supply voltage VCC is applied. Here, the power supply voltage VCC can be a DC voltage.

The source node or the drain node of the first reception transistor RXT1 can be electrically connected to the drain node or the source node of the source reception transistor RXT2. Here, a point (a node) to which the first reception transistor RXT1 and the second reception transistor RXT2 are connected may be referred to as an intermediate node Ni.

The first reception transistor RXT1 can be electrically connected between the intermediate node Ni and the power supply line VL. The first reception transistor RXT1 can be controlled by a voltage of the first driving electrode DE1 electrically connected to a gate node.

The second reception transistor RXT2 can be controlled by a second scan signal SC(n−1) supplied through a second scan line SCL(n−1), and electrically connected between the intermediate node Ni and the readout line RL. The second reception transistor RXT2 can be controlled by an (n−1)th scan signal SC(n−1) applied to the gate node through an (n−1)th scan line SCL(n−1). Hereinafter, taking into a scanning order account, the second scan line and the second scan signal are referred to as an (n−1)th scan line SCL(n−1) and an (n−1)th scan signal SC(n−1), respectively.

In a situation where the (n−1)th scan signal SC(n−1) with a turn-on level voltage is applied to the gate node of the second reception transistor RXT2, when the first reception transistor RXT1 become turned on due to a change in voltage of the driving node Nd, the readout circuit RX-CC can be electrically connected to the power supply line VL.

Thus, the readout circuit RX-CC can detect the power supply voltage VCC or an electrical signal corresponding to the power supply voltage as a sensing signal.

One pixel PXL can be operated in the driving mode (transmission mode) or in the sensing mode (reception mode).

In the case of the pixel shown in FIG. 7, the pixel can be operated in the sensing mode (reception mode) during a Tn−1 interval. That is, during the Tn−1 interval, the (n−1)th scan signal SC(n−1) with a turn-on voltage level is applied to the gate node of the second reception transistor RXT2 in the corresponding pixel PXL. However, during the Tn−1 interval, in order for the corresponding pixel PXL to not be operated in the driving mode (transmission mode), the n-th scan signal SC(n) with a turn-off voltage level can be applied to the gate node of the transmission transistor TXT in the corresponding pixel PXL.

During the Tn−1 interval, when ultrasonic waves generated from one or more other pixels PXL are received by the corresponding pixel shown in FIG. 7 after having been reflected from adjacent areas, the piezoelectric material layer PIEZO of the transducer TRDS vibrates, and cause a change in voltage of the first driving electrode DE1 to occur. Thus, the first reception transistor RXT1 can be turned on. As a result, both the first and second reception transistors can be turned on, and the readout circuit RX-CC can detect a power supply voltage VCC of the power supply line VL as a sensing signal through the readout line RL.

In the case of the pixel shown in FIG. 7, the pixel can be operated in the driving mode (transmission mode) during a Tn interval other than the Tn−1 interval. That is, during the Tn interval, the n-th scan signal SC(n) with a turn-on voltage level can be applied to the gate node of the transmission transistor TXT in the corresponding pixel PXL. However, during the Tn interval, in order for the corresponding pixel PXL to not be operated in the sensing mode (reception mode), the (n−1)th scan signal SC(n−1) with a turn-off voltage level can be applied to the gate node of the second reception transistor RXT2 in the corresponding pixel PXL.

That is, during the Tn interval, the n-th scan signal SC(n) with a turn-on voltage level may be applied to the gate node of the transmission transistor TXT in the corresponding pixel PXL, and thus the transmission transistor becomes turned on. A driving signal DS can be applied to the first driving electrode DE1 of the transducer TRDS due to the turn-on of the transmission transistor TXT. At this time, a bias voltage GB has been applied to the second driving electrode DE2 of the transducer TRDS. Accordingly, the piezoelectric material layer PIEZO between the first driving electrode DE1 and the second driving electrode DE2 vibrates, and thus ultrasonic waves are generated.

The n-th scan line SCL(n) and the (n−1)th scan line SCL(n−1) can be disposed to correspond to each pixel column (or row) per pixel column (or row). That is, with respect to one pixel row (or a column), the n-th scan line SCL(n) and the (n−1)th scan line SCL(n−1) may be disposed to correspond to each pixel.

Alternatively, each of the n-th scan line SCL(n) and the (n−1)th scan line SCL(n−1) may be commonly connected to two or more pixel columns (or rows). That is, the (n−1)th scan line SCL(n−1) may be commonly connected to a reception portion RX-PART of a first pixel and a transmission portion TX-PART of one or more pixels PXL adjacent to the reception portion RX-PART of the first pixel. The n-th scan line SCL(n) may be commonly connected to a transmission portion TX-PART of a first pixel and a reception portion RX-PART of one or more pixels PXL adjacent to the transmission portion TX-PART of the first pixel.

Figure 8:
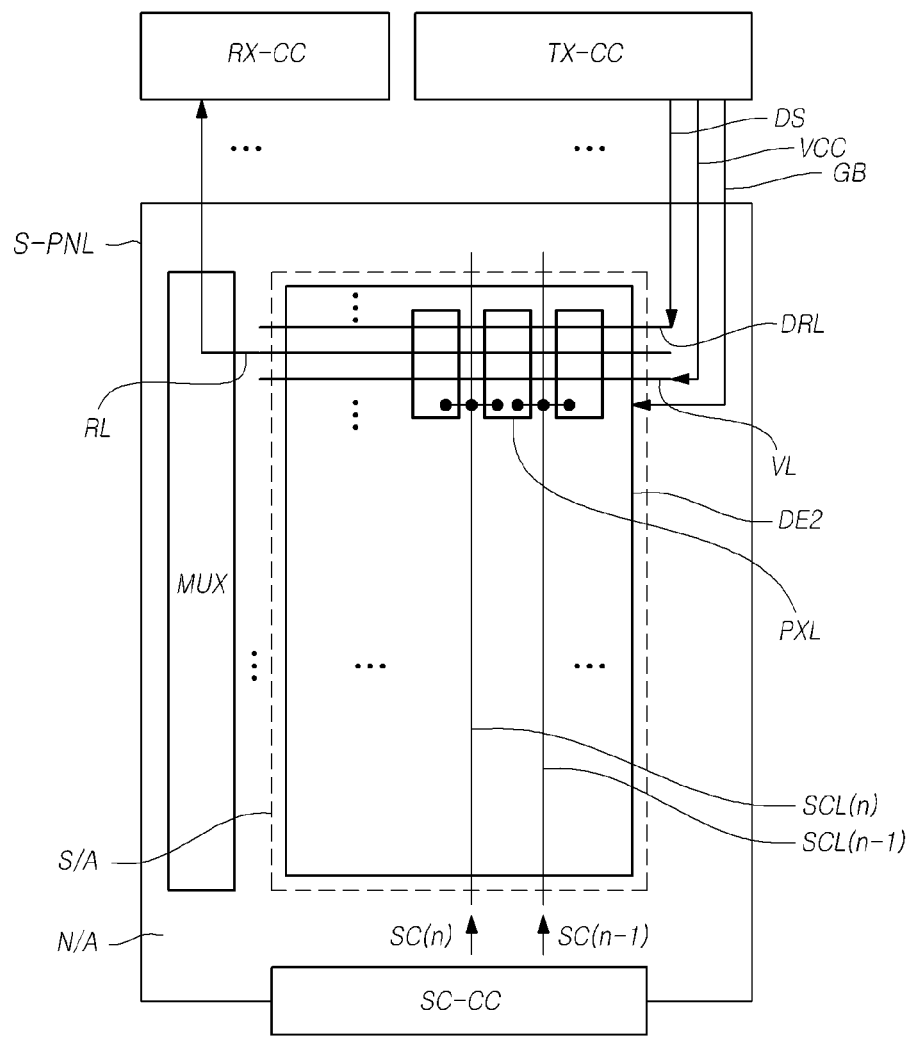
FIG. 8 is a diagram illustrating a signal system for fingerprint sensing of the complex sensing device according to embodiments of the present disclosure.

FIG. 8 is a diagram illustrating a signal system for fingerprint sensing of the complex sensing device 100 according to embodiments of the present disclosure.

Referring to FIG. 8, an area S/A in which fingerprint sensing is available is disposed in the fingerprint panel F-PNL, and a plurality of pixels PXL can be disposed in the area S/A.

In the FIG. 8, fingerprint panel F-PNL can include a plurality of driving lines DRL, a plurality of power supply lines VL, a plurality of scan lines (SCL(n−1), SCL(n), . . . ), a plurality of readout lines RL, a second driving electrode DE2, or the like.

Each of the plurality of driving lines DRL, the plurality of power supply lines VL, the plurality of readout lines RL and the second driving electrode DE2 can be disposed in various shapes, arrangements, layouts, or structures, or with various numbers.

The driving line DRL can be disposed in a pixel row direction or a pixel column direction. Hereinafter, it is considered that for convenience of description, the driving line DRL is disposed in the pixel row direction, as shown in FIG. 8.

One driving line DRL can be disposed every one pixel row or two or more pixel rows. As another example, one driving line DRL can be disposed every one pixel column or two or more pixel columns. As further another example, the driving line DRL can be disposed in a mesh form.

The plurality of driving lines DRL can simultaneously or substantially simultaneously deliver a driving signal DS to all pixels included in a corresponding pixel column (e.g., or alternatively, row) at a certain time point or in a certain time interval.

Alternatively, one or more of the plurality of driving lines DRL can simultaneously or substantially simultaneously deliver a driving signal DS to only one or more of pixels included in a corresponding pixel column (e.g., or alternatively, row) at a certain time point or in a certain time interval. According to this embodiment, it is possible to reduce power consumption caused by supplying the driving signal, and it may be more advantageous in a partial sensing scheme of sensing only one or more of pixels PXL to be sensed included in the corresponding pixel column.

In addition, the supplying of a driving signal DS to each of the plurality of driving lines DR can be controlled individually and/or independently.

The power supply line VL can be disposed in a pixel row direction or a pixel column direction. Hereinafter, it is considered that for convenience of description, the power supply line VL is disposed in the pixel row direction, as shown in FIG. 8.

One power supply line VL can be disposed every one pixel row or two or more pixel rows. As another example, one power supply line VL can be disposed every one pixel column or two or more pixel columns. As further another example, the power supply line VL can be disposed in a mesh form.

The plurality of power supply lines VL can simultaneously or substantially simultaneously deliver a power supply voltage VCC to all pixels included in a corresponding pixel column (e.g., or alternatively, row).

Alternatively, one or more of the plurality of power supply lines VL can simultaneously or substantially simultaneously deliver a power supply voltage VCC to only one or more of pixels included in a corresponding pixel column (e.g., or alternatively, row). According to this embodiment, it is possible to reduce power consumption caused by supplying the power supply voltage, and it may be more advantageous in a partial sensing scheme of sensing only one or more of pixels PXL to be sensed included in the corresponding pixel column (e.g., or alternatively, row).

In addition, the suppling of a power supply voltage to each of the plurality of power supply lines VL can be controlled individually and/or independently.

The scan lines (SCL(n−1), SCL(n), . . . ) can be disposed in a pixel row direction or a pixel column direction, e.g., disposed in parallel to the pixel row or the pixel column. Hereinafter, it is considered that for convenience of description, the scan lines (SCL(n−1), SCL(n), . . . ) are disposed in the pixel column direction, as shown in FIG. 8. Here, the n−1, the n, etc. can mean the order of scan lines.

Each scan line (SCL(n−1), SCL(n)) can be commonly connected to two or more pixel columns (or two or more pixel rows). That is, the (n−1)th scan line SCL(n−1) can be disposed between two pixel columns, and the n-th scan line SCL(n) can be disposed between two pixel columns. For example, the (n−1)th scan line SCL(n−1) can be commonly connected to a reception portion RX-PART of a first pixel and a transmission portion TX-PART of another pixel PXL adjacent to the reception portion RX-PART of the first pixel. The n-th scan line SCL(n) can be commonly connected to a transmission portion TX-PART of a first pixel and a reception portion RX-PART of another pixel PXL adjacent to the transmission portion TX-PART of the first pixel.

The readout line RL can be disposed in parallel to a pixel row or a pixel column.

One readout line RL can be disposed every one pixel row or two or more pixel rows. As another example, one readout line RL can be disposed every one pixel column or two or more pixel columns.

The second driving electrode DE2 can be one large plate electrode in the form of a plate spread over the whole area of the fingerprint panel F-PNL. As another example, the second driving electrode DE2 may be divided into several portions, and the divided portions may be disposed in respective areas of the plurality of pixels PXL. Meanwhile, each first driving electrode DE1 can be disposed in an area of each of the plurality of pixels PXL.

Referring to FIG. 8, the fingerprint circuit F-CC can include a scanning circuit SC-CC, a transmission circuit TX-CC, a reception circuit RX-CC, a multiplexer MUX, or the like.

The scanning circuit SC-CC can output the n-th scan signal and the (n−1)th scan signal SL(n−1) to the n-th scan line SCL(n) and the (n−1)th scan line SCL(n−1), respectively.

Thus, all or at least one of pixels PXL included in a first pixel column of the plurality of pixel columns may be operated in the driving mode, and all or at least one of pixels PXL included in a second pixel column can be operated in the sensing mode.

The all or at least one of pixels operated in the driving mode can mean one or more pixels generating ultrasonic waves, and the all or at least one of pixels operated in the sensing mode can mean one or more pixels receiving ultrasonic waves. At a certain time or in a certain time interval, one or more pixels PXL operated in the driving mode may be different from, or identical to, one or more pixels PXL operated in the sensing mode which are adjacent to the one or more pixels PXL operated in the driving mode.

The transmission circuit TX-CC can output the driving signal DS, the bias voltage GB and the power supply voltage VCC to the fingerprint panel F-PNL.

The bias voltage GB can be applied to the second driving electrode DE2 disposed on the fingerprint panel F-PNL.

The power supply voltage VCC can be supplied to the power supply line VL disposed on the fingerprint panel F-PNL.

The transmission circuit TX-CC and the reception circuit RX-CC etc. may be implemented as separate components, or implemented as one component in which the transmission circuit TX-CC and the reception circuit RX-CC etc. are integrated into the one component.

The multiplexer MUX can be included in the reception circuit RX-CC, or implemented with several switching elements (e.g., transistors).

The scanning circuit SC-CC can be located outside the fingerprint panel F-PNL, or may be mounted in an edge of the fingerprint panel F-PNL.

Figure 9:
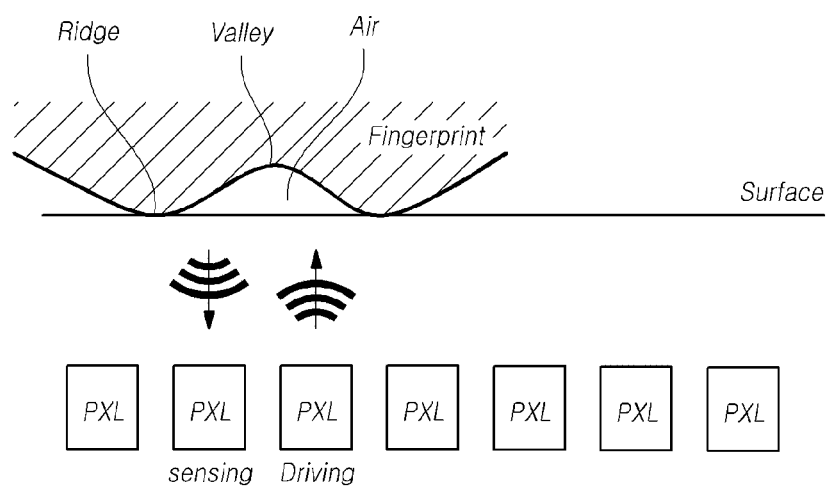
FIG. 9 is a diagram illustrating a principle of fingerprint sensing of the complex sensing device according to embodiments of the present disclosure.

FIG. 9 is a diagram illustrating a principle of fingerprint sensing of the complex sensing device 100 according to embodiments of the present disclosure.

Referring to FIG. 9, the complex sensing device 100 in accordance with embodiments of the present disclosure can recognize (detect) a fingerprint based on ultrasonic waves.

When one or more driving pixels D-PXL operated in the driving mode among the plurality of pixels PXL are driven, and ultrasonic waves are generated in the one or more driving pixels D-PXL, the generated ultrasonic waves can be reflected from the fingerprint of a finger that has contacted the surface (can be the surface of a cover glass) of the complex sensing device 100.

The fingerprint is formed by ridges and valleys. The ridges contact the surface of the complex sensing device 100, or are closer to the surface of the complex sensing device 100 than the valleys. The valleys may not contact the surface of the complex sensing device 100, or be further spaced apart from the surface of the complex sensing device 100 compared with the ridges.

There exists air between the surface of the complex sensing device 100 and the skin of the valleys of the fingerprint. When ultrasonic waves generated from the driving pixel D-PXL reach the air layer, most of ultrasonic waves that reached the air layer may be reflected due to a difference between the surface of the complex sensing device 100 and the acoustic impedance of air, and then travel inside the complex sensing device 100.

The ridges of the fingerprint contact the surface of the complex sensing device 100. The ultrasonic waves generated from the driving pixel D-PXL reach the skin of the ridges. Some of ultrasonic waves having reached the skin of the ridges may be reflected, but most of the ultrasonic waves may travel inside the skin and then are reflected from an inside area of the skin.

Accordingly, ultrasonic waves received by the sensing pixel S-PXL of the complex sensing device 100 after having been reflected from each of the ridges and the valleys of the fingerprint can have different reception intensities or reception times (reception delays), and as a result of this, the complex sensing device 100 can recognize the fingerprint based on different features between the ridges and the valleys.

Thus, since the complex sensing device 100 uses a sensing scheme allowing an inside area of the skin to be sensed, it is not sensitive to the contamination or condition of the skin surface, and it is possible to provide high security related to the fingerprint corresponding to personal information.

Figure 10:
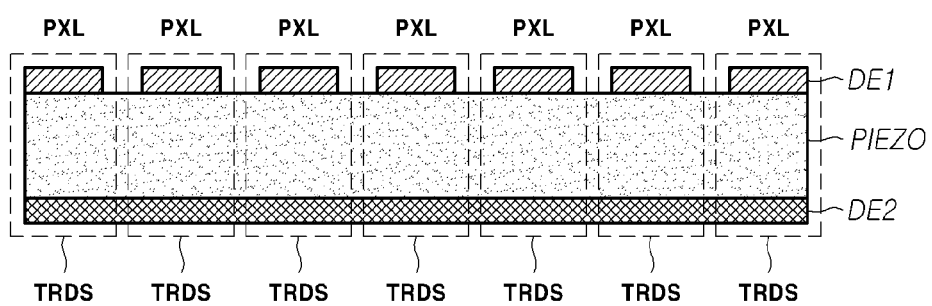
FIG. 10 is a diagram illustrating a transducer in each pixel disposed in the fingerprint panel of the complex sensing device according to embodiments of the present disclosure.

FIG. 10 is a diagram illustrating a transducer TRDS in each pixel PXL disposed in the fingerprint panel F-PNL of the complex sensing device 100 according to embodiments of the present disclosure.

Referring to FIG. 10, each pixel PXL includes a transducer TRDS, and the transducer TRDS includes a first driving electrode DE1, a pixel PIEZO, and a second driving electrode DE2.

As shown in FIG. 10, in the fingerprint panel F-PNL, the piezoelectric material layer PIEZO can be in the form of a plate, and be disposed commonly in the whole area of the plurality of pixels.

Alternatively, in the fingerprint panel F-PNL, the piezoelectric material layer PIEZO may be divided into portions corresponding to sizes of respective areas of the plurality of pixels, and the divided portions may be disposed in respective areas of the plurality of pixels. That is, the piezoelectric material layer PIEZO can include a plurality of divided piezoelectric material layers. Such a structure may be more suitable for a partial sensing scheme of sensing only one or more of pixels PXL to be sensed included in the corresponding pixel column.

That is, the piezoelectric material layer PIEZO may be configured to be spread over the whole of the pixels, or be divided into several portions and then the divided portions may be disposed in respective pixel areas.

As shown in FIG. 10, the second driving electrode DE2 can be in the form of a plate, and be disposed commonly in the whole area of the plurality of pixels.

Alternatively, the second driving electrode DE2 may be divided into portions corresponding to sizes of respective areas of the plurality of pixels, and the divided portions may be disposed in respective areas of the plurality of pixels. Such a structure can be more suitable for a partial sensing scheme of sensing only one or more of pixels PXL to be sensed included in the corresponding pixel column. When the partial sensing scheme is used, it is possible to reduce power consumption.

In other words, the second driving electrode DE2 may be configured to be spread over the whole of the pixels, or be divided into several portions and then the divided portions may be disposed in respective pixel areas.

Figure 11:
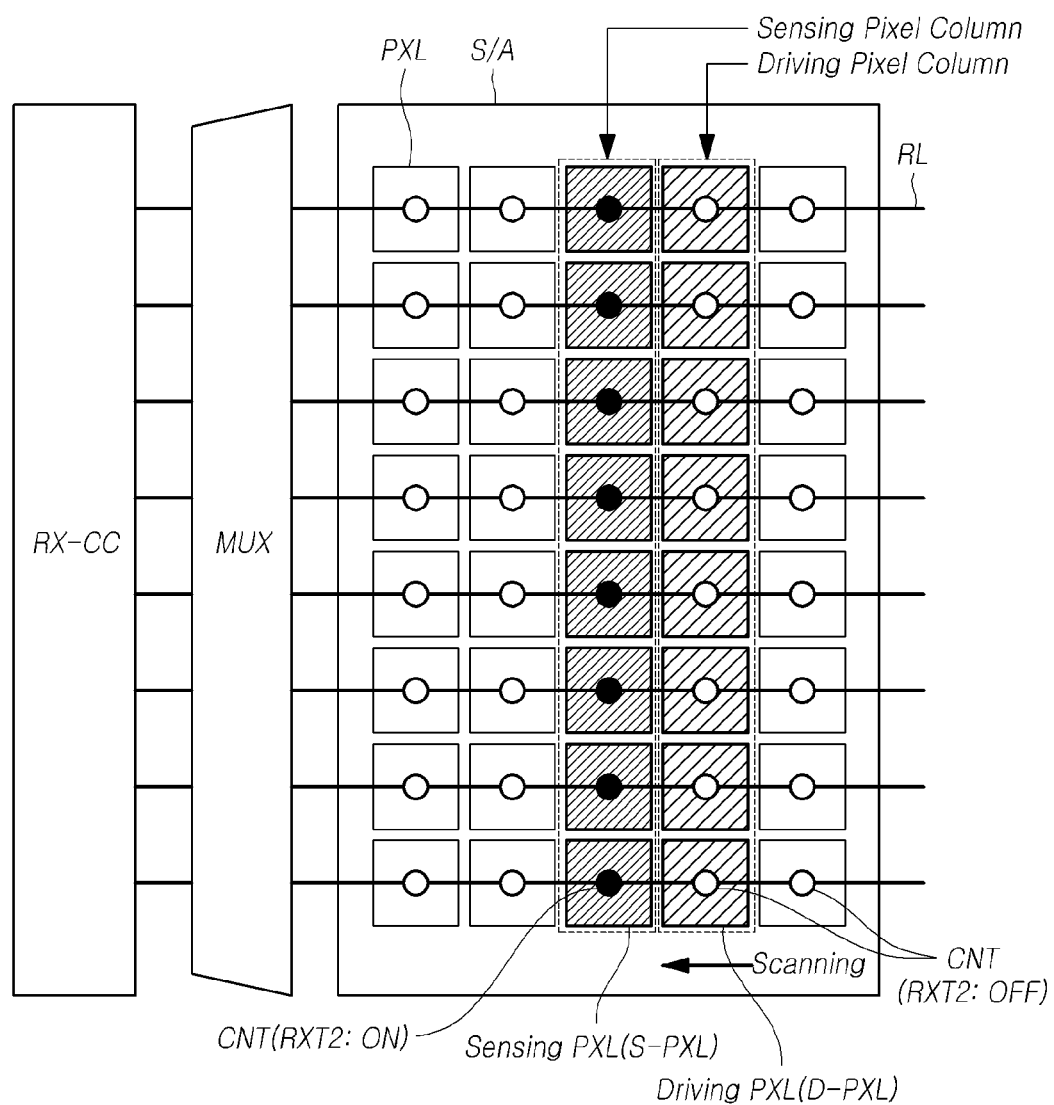
FIG. 11 is a diagram illustrating fingerprint sensing operations performed based on scanning in a first direction, according to embodiments of the present disclosure.
Figure 12:
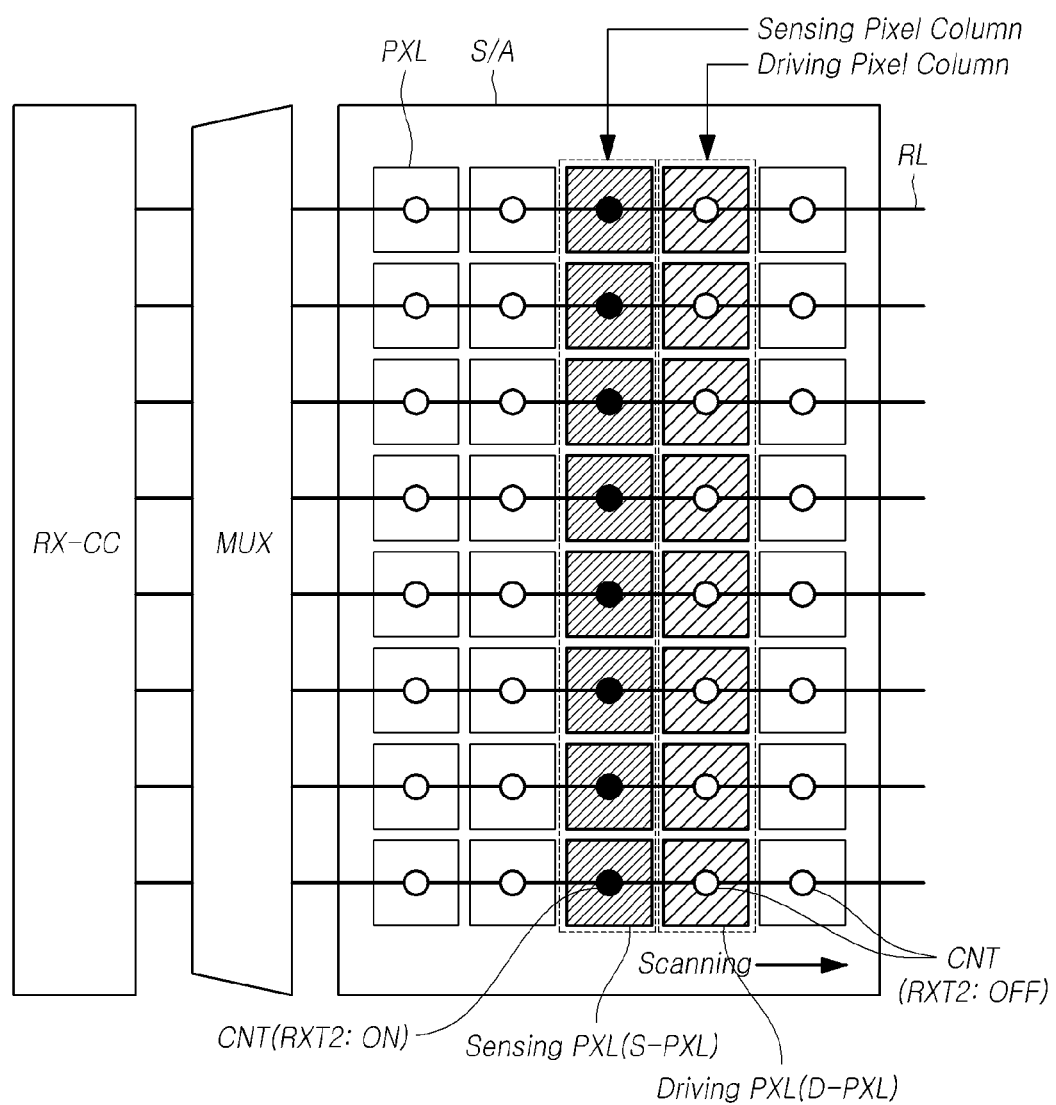
FIG. 12 is a diagram illustrating fingerprint sensing operations performed based on scanning in a second direction, according to embodiments of the present disclosure.

FIG. 11 is a diagram illustrating fingerprint sensing operations performed by the complex sensing device 100 based on scanning in a first direction, according to embodiments of the present disclosure. FIG. 12 is a diagram illustrating fingerprint sensing operations performed by the complex sensing device 100 based on scanning in a second direction, according to embodiments of the present disclosure.

Referring to FIGS. 11 and 12, one readout line RL can be disposed in each of a plurality of pixel rows.

Each readout line RL can be electrically connected to the source node or the drain node of a second reception transistor RXT2 of each pixel PXL included in a corresponding pixel row. That is, one readout line RL can be electrically connected to source nodes or drain nodes of respective second reception transistors RXT2 of a plurality of pixels PXL through a plurality of contact points CNT.

For example, an insulating layer can be disposed on the source node or the drain node of the second reception transistor RXT2 of each of the plurality of pixels PXL, and the readout line can be disposed on the insulating layer. The readout line RL can be electrically connected to the source nodes or the drain nodes through contact holes of the insulating layer at the contact points CNT.

As shown in FIGS. 11 and 12, at a certain time point or in a certain time interval, one of the plurality of pixel columns can be a driving pixel column, and another pixel column adjacent to the driving pixel column can be a sensing pixel column. Pixels included in the driving pixel column can be referred to as a driving pixel D-PXL. Pixels included in the sensing pixel column can be referred to as a sensing pixel D-PXL.

One or more pixels corresponding to the driving pixel D-PXL operated in the driving mode (transmission mode) can generate ultrasonic waves, and one or more pixels corresponding to the sensing pixels S-PXL operated in the sensing mode (reception mode) can receive ultrasonic waves reflected from a fingerprint after ultrasonic waves have been generated by the one or more pixels corresponding to the driving pixel D-PXL.

One or more second reception transistors RXT2 included in the one or more pixels corresponding to the sensing pixels S-PXL have been turned on. One or more second reception transistors RXT2 included in the one or more pixels corresponding to the driving pixel D-PXL have been turned off, one or more second reception transistors RXT2 included one or more pixels PXL other than the one or more pixels corresponding to the sensing pixels S-PXL and the one or more pixels corresponding to the driving pixel D-PXL have been turned off. Accordingly, a reception circuit RX-CC can detect only signals from the one or more pixels corresponding to the sensing pixels S-PXL through the readout line RL.

As shown in FIGS. 11 and 12, a sensing pixel column can be a pixel column closer to the multiplexer MUX than a driving pixel column. When the location of the transmission portion TX-PART and the reception portion RX-PART is changed, or a current driving scheme is switched, in the pixel circuit as shown in FIGS. 11 and 12, a driving pixel column can be a pixel column closer to the multiplexer MUX than a sensing pixel column.

Meanwhile, as shown in FIG. 11, the fingerprint circuit F-CC can sense all pixels PXL by sequentially selecting and scanning sensing pixel columns in a first direction toward the multiplexer MUX.

Alternatively, as shown in FIG. 12, the fingerprint circuit F-CC can sense all pixels PXL by sequentially selecting and scanning sensing pixel columns in a second direction away from the multiplexer MUX.

FIGS. 11 and 12 show that at a certain time point or in a certain time interval, all pixels D-PXL included in one pixel column are operated in the driving mode, and all pixels S-PXL included in one pixel column are operated in the sensing mode.

This process corresponds to a fingerprint sensing scheme of sensing a fingerprint by scanning all pixels PXL disposed in the fingerprint panel F-PNL. Such a fingerprint sensing scheme may be referred to as a full fingerprint sensing process or a global scan based fingerprint sensing process.

In some instances, at a certain time point or in a certain time interval, pixels D-PXL operated in the driving mode may be one or more, not all, of pixels included in one pixel column, and pixels S-PXL operated in the sensing mode may be one or more, not all, of pixels included in one pixel column.

This process corresponds to a fingerprint sensing scheme of sensing a fingerprint by scanning one or more of all pixels PXL disposed in the fingerprint panel F-PNL. Such a fingerprint sensing scheme may be referred to as a partial fingerprint sensing process or a local scan based fingerprint sensing process.

Figure 13A:
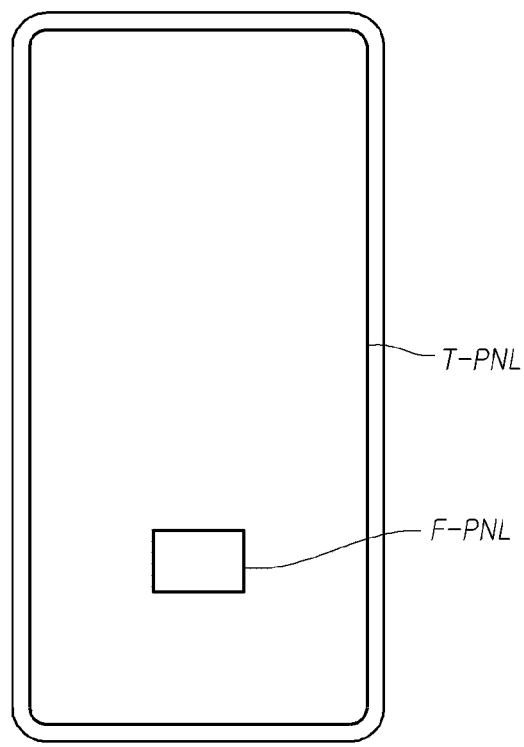
FIGS. 13A, 13B, and 13C are diagrams illustrating an application of a global scan based fingerprint sensing process of the complex sensing device according to embodiments of the present disclosure.
Figure 13B:
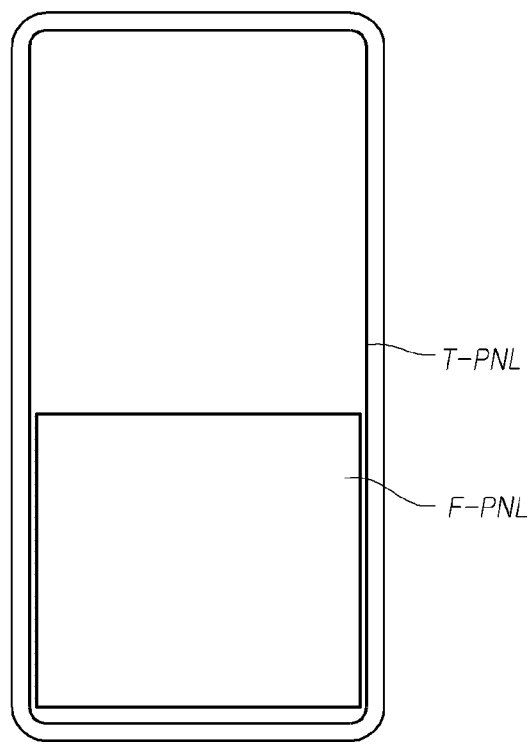
Figure 13C:
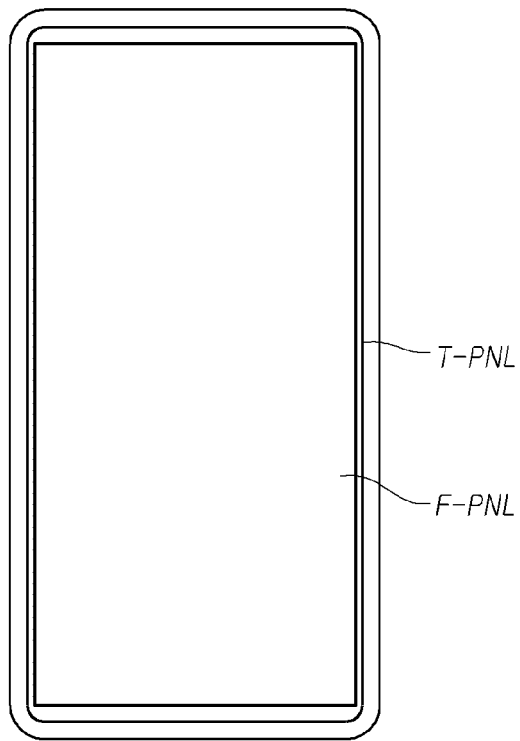

FIGS. 13A to 13C are diagrams illustrating an application of the global scan based fingerprint sensing process of the complex sensing device 100 according to embodiments of the present disclosure.

As shown in FIG. 13A, a fingerprint panel F-PNL may be much smaller than the touch panel T-PNL, that is, corresponding to approximately one finger size.

This is an embodiment in which an area for sensing a fingerprint of a user is designed to sense approximately one fingerprint, and the area for sensing the fingerprint may be fixed in a small area of the fingerprint panel F-PNL.

In this embodiment, since the size of the fingerprint panel F-PNL is small to the extent that approximately one fingerprint can be sensed, the fingerprint circuit F-CC can scan and sense the whole of the small area of the fingerprint panel F-PNL.

As another embodiment, as shown in FIG. 13B, a fingerprint panel F-PNL may be much larger than one finger size although it is smaller than the touch panel T-PNL.

This is an embodiment in which an area for sensing the fingerprint of a user is designed to have a size larger than a size suitable for sensing approximately one fingerprint. In this embodiment, the fingerprint sensing can be performed in various locations within the whole area of the fingerprint panel F-PNL. That is, an area for sensing the fingerprint of a user can be changed. In this embodiment, the fingerprint circuit F-CC can sense the fingerprint by scanning (globally scanning) the whole area of the fingerprint panel F-PNL.

As further another embodiment, as shown in FIG. 13C, the size of a fingerprint panel F-PNL can be similar or equal to that of the touch panel T-PNL.

In this embodiment, fingerprint sensing can be performed freely in wide area. That is, the fingerprint sensing can be performed in various locations within the whole area of the fingerprint panel F-PNL. In this embodiment, the fingerprint circuit F-CC can sense the fingerprint by scanning (globally scanning) the whole area of the fingerprint panel F-PNL.

As described above, for the fingerprint sensing, in order for ultrasonic waves to be generated from the transducer TRDS in each pixel PXL, the piezoelectric material layer PIEZ in the transducer TRDS may be vibrated using a driving signal DS that has a frequency greater than or equal to a certain frequency (e.g., 20 KHz, etc.) and that has a considerably high voltage corresponding to a high level voltage.

Accordingly, the global scan based fingerprint sensing process is disadvantage for scanning the whole wide area to sense (recognize) a small fingerprint because it causes unnecessary power consumption. Such a disadvantage may be greater as the size for sensing a fingerprint becomes larger as shown in FIGS. 13B and 13C.

Figure 14A:
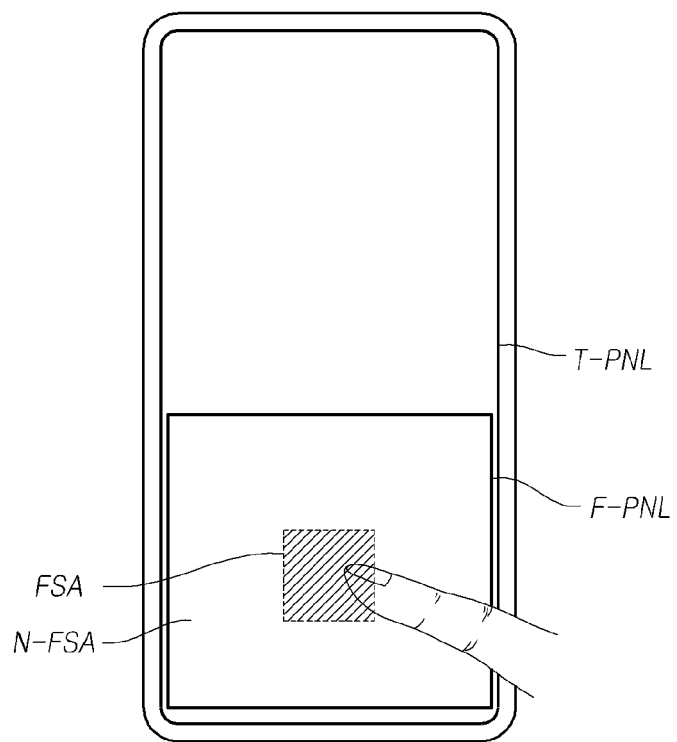
FIGS. 14A and 14B are diagrams illustrating an application of a local scan based fingerprint sensing process of the complex sensing device according to embodiments of the present disclosure.
Figure 14B:
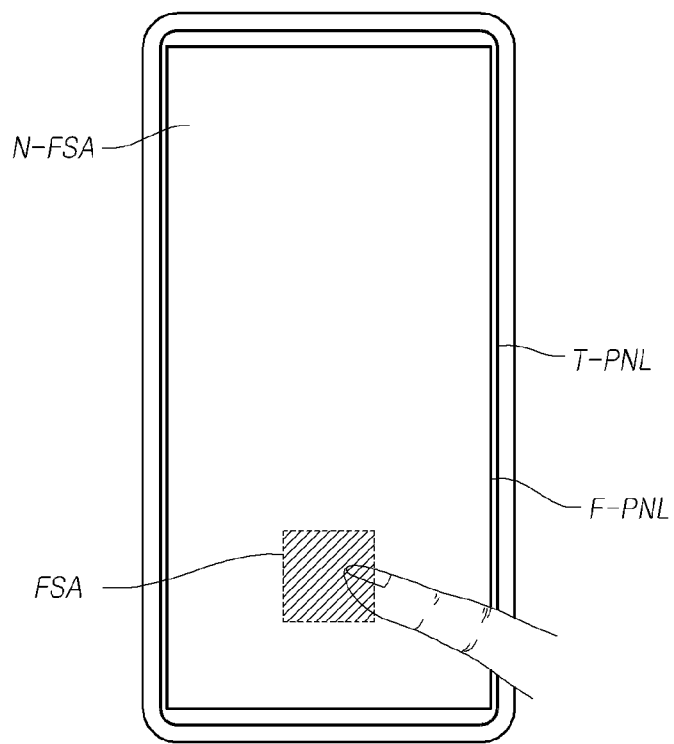

FIGS. 14A to 14B are diagrams illustrating an application of the local scan based fingerprint sensing process of the complex sensing device 100 according to embodiments of the present disclosure.

Referring to FIG. 14A, when a fingerprint panel F-PNL is smaller than the touch panel T-PNL, but much larger than one fingerprint size, the fingerprint circuit F-CC can set, as a fingerprint sensing area FSA, an area of the fingerprint panel F-PNL, and sense only the set fingerprint sensing area FSA.

Referring to FIG. 14B, when a fingerprint panel F-PNL has a size similar or equal to the touch panel T-PNL, the fingerprint circuit F-CC can set, as a fingerprint sensing area FSA, an area of the fingerprint panel F-PNL, and sense only the set fingerprint sensing area FSA.

In other words, referring to FIGS. 14A and 14B, the fingerprint circuit F-CC can scan (locally scan) only the fingerprint sensing area FSA that is a part of the whole area of the fingerprint panel F-PNL, and sense the fingerprint. Such a fingerprint sensing process may be referred to as a partial fingerprint sensing process or a local scan based fingerprint sensing process. The fingerprint sensing area FSA may be smaller than an area of the fingerprint panel F-PNL defined by a plurality of pixels of the fingerprint panel F-PNL. The fingerprint sensing area FSA may include a subset of pixels of the fingerprint panel F-PNL.

According to the local scan based fingerprint sensing process (or the partial fingerprint sensing process), the fingerprint circuit F-CC supplies a driving signal DS etc. for fingerprint sensing to only a fingerprint sensing area FSA and a periphery area thereof, and thus it is unnecessary to drive the other area(s) except for the fingerprint sensing area FSA and the periphery area thereof. Accordingly, it is possible to reduce unnecessary power consumption, and therefore, to that extent, a large area fingerprint sensor can be more efficiently implemented.

In FIGS. 14A and 14B, a part, in which operations (driving, generating ultrasonic waves, receiving the ultrasonic waves, signal detecting, etc.) for fingerprint sensing are actually performed, of the whole area of the fingerprint panel F-PNL is referred to as a fingerprint sensing area FSA, which may be referred to as a driving area. The remaining area N-FSA except for the fingerprint sensing area FSA of the whole area of the fingerprint panel F-PNL is an area in which the operations (driving, generating ultrasonic waves, receiving the ultrasonic waves, signal detecting, etc.) for fingerprint sensing are not performed, and is referred to as a non-driving area.

Figure 15:
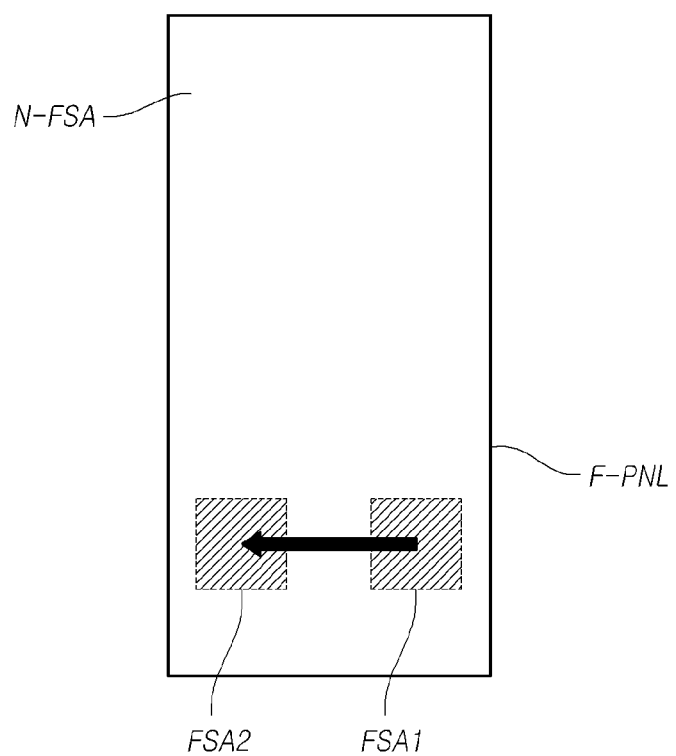
FIGS. 15 and 16 are diagrams illustrating another application of the local scan based fingerprint sensing process of the complex sensing device according to embodiments of the present disclosure.
Figure 16:
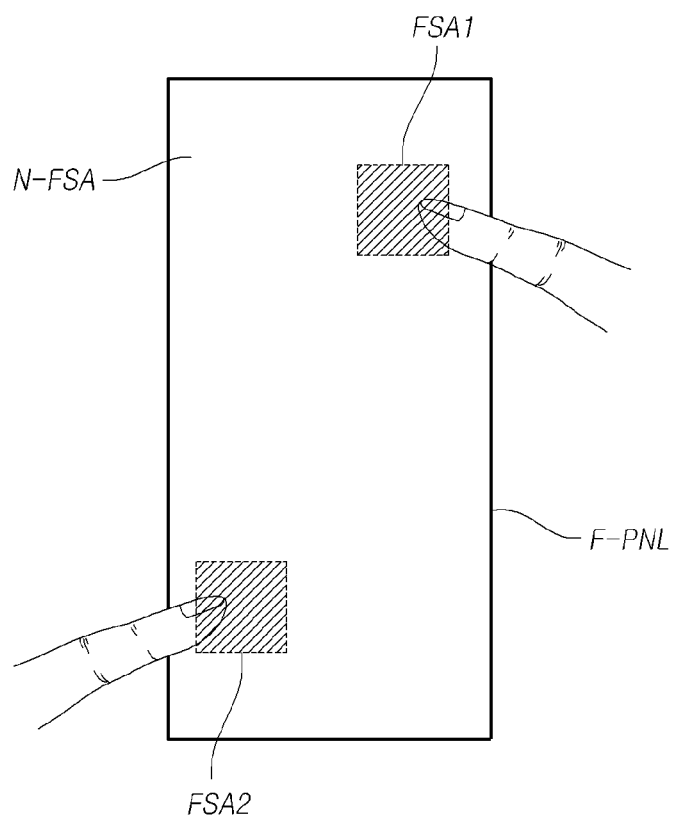

FIGS. 15 to 16 are diagrams illustrating another application of the local scan based fingerprint sensing process of the complex sensing device 100 according to embodiments of the present disclosure.

Referring to FIG. 15, a fingerprint sensing area FSA can be changed within the whole area of the fingerprint panel F-PNL. That is, the fingerprint sensing area FSA can be moved to various locations within the whole area of the fingerprint panel F-PNL.

Referring to FIG. 15, at a certain time, a first fingerprint sensing area may set within the whole area of the fingerprint panel F-PNL, and thereafter, at another time, a second fingerprint sensing area FSA2 may be set in a different location from the first fingerprint sensing area FSA1 within the whole area of the fingerprint panel F-PNL.

Referring to FIG. 16, within the whole area of the fingerprint panel F-PNL, not only may one fingerprint sensing area FSA be set, but at least two fingerprint sensing areas FSA1 and FSA2 may be set simultaneously or together. That is, at least two fingerprints in different locations within the whole area of the fingerprint panel F-PNL can be sensed simultaneously or together. In other words, the complex sensing device 100 in accordance with embodiments of the present disclosure can provide multi-fingerprint sensing.

Meanwhile, an area on which the fingerprint of a user is contacted, that is, an area for sensing the fingerprint, may be in an identical (e.g., same) direction, or an identical surface, to an area for sensing a touch. That is, it is possible for a user to touch or contact a fingerprint on one surface of the device, such the front surface.

Alternatively, an area on which the fingerprint of a user is contacted, that is, an area for sensing the fingerprint, can be in a different direction, or a different surface, from an area for sensing a touch. That is, it is possible for a user to touch on the front surface, and contact a fingerprint on another surface of the device, such as the rear surface.

Figure 17:
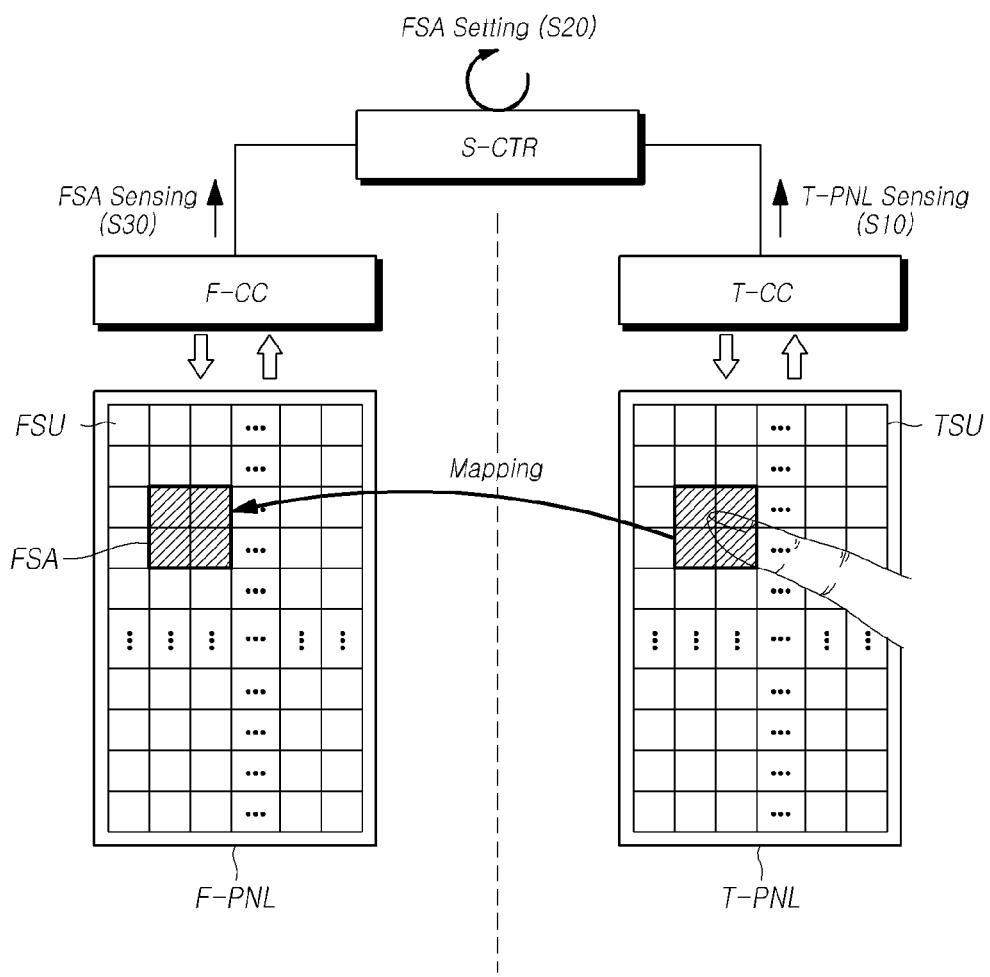
FIG. 17 is a diagram illustrating the local scan based fingerprint sensing process using results of touch sensing, in the complex sensing device according to embodiments of the present disclosure.

FIG. 17 is a diagram illustrating the local scan based fingerprint sensing process using results of touch sensing in the complex sensing device 100 according to embodiments of the present disclosure.

Referring to FIG. 17, the complex sensing device 100 according to embodiments of the present disclosure can perform the local scan based fingerprint sensing process (the partial fingerprint sensing process).

Referring to FIG. 17, the complex sensing device 100 can include a touch panel T-PNL on which a plurality of touch electrodes TE is disposed, a fingerprint panel F-PNL on which a plurality of pixels PXL is disposed, a touch circuit T-CC outputting first sensing data TSDATA by sensing the touch panel T-PNL, a fingerprint circuit F-CC outputting second sensing data FSDATA by sensing a fingerprint sensing area FSA on the fingerprint panel F-PNL, and a sensing controller S-CTR setting the fingerprint sensing area FSA for enabling the fingerprint circuit F-CC to sense the fingerprint panel F-PNL based on the first sensing data TSDATA of the touch circuit T-CC.

In order to perform the local scan based fingerprint sensing process (the partial fingerprint sensing process, the sensing controller S-CTR can determine the location of a touch (e.g., one or more touch sensor units TSU) based on the first sensing data TSDATA outputted from the touch circuit T-CC, and set, as the fingerprint sensing area FSA, a part of the whole area of the fingerprint panel F-PNL based on the determined touch location.

Such a location set as the fingerprint sensing area FSA may be the same always, or changed at a certain time point, in a certain time interval, or every time when the sensing is performed.

In addition, the number of fingerprint sensing areas FSA may be one, or at least two. That is, the sensing controller S-CTR can set one fingerprint sensing area FSA, or at least two fingerprint sensing areas FSA in different locations based on the first sensing data TSDATA outputted from the touch circuit T-CC.

A sensing method of the complex sensing device 100 including the touch panel T-PNL and the fingerprint panel F-PNL can include sensing the touch panel T-PNL by the global scan process or the local scan process, at step S10, setting a fingerprint sensing area FSA corresponding to an area of the fingerprint panel F-PNL based on a result of the sensing of the touch panel T-PNL, at step S20, and locally sensing the fingerprint sensing area FSA of the fingerprint panel F-PNL, at step S30.

The plurality of touch sensor units TSU of the touch panel T-PNL can be areas separated from one another, and defined by the plurality of touch electrodes TE located on the touch panel T-PNL.

When the touch panel T-PNL is a touch panel T-PNL capable of providing a mutual capacitance based touch sensing as shown in FIG. 3, that is, the plurality of touch electrodes TE include driving touch electrodes D-TE and sensing touch electrodes S-TE for sensing a mutual capacitance, each of the plurality of touch electrode units TSU can be defined in an area in which each of the driving touch electrodes D-TE and each of the sensing touch electrodes S-TE intersect.

When the touch panel T-PNL is a touch panel T-PNL capable of providing a self-capacitance based touch sensing as shown in FIG. 5, that is, the plurality of touch electrodes TE are touch electrodes TE for sensing a self-capacitance, each of the plurality of touch electrode units TSU can correspond to each of the plurality of touch electrodes TE.

The plurality of fingerprint sensor units FSU of the fingerprint panel F-PNL can be areas separated from one another, and each of the plurality of fingerprint sensor units FSU can correspond to each of the plurality of pixels PXL. That is, one pixel PXL can be one fingerprint sensor unit FSU.

As described above, each of the plurality of pixels located in the fingerprint panel F-PNL can include a TRDS including a first driving electrode DE1, a piezoelectric material layer PIEZO, and a second driving electrode DE2, a transmission transistor TXT controlled by a first scan signal SC(n), and electrically connected between a driving line DRL to which a first driving signal DS is supplied and the first driving electrode DE1, and a first reception transistor RXT1 and a second reception transistor RXT2 electrically connected between a readout line RL and a power supply line VL to which a power supply voltage VCC is supplied.

The first reception transistor RXT1 can be electrically connected between the power supply line and an intermediate node corresponding to a connection point between the first transistor RXT1 and the second transistor RXT2.

The second reception transistor RXT2 can be controlled by a second scan signal SC(n−1), and electrically connected between the intermediate node Ni and the readout line RL.

The pixels PXL disposed on the fingerprint panel F-PNL may be operated in the driving mode (transmission mode) or in the sensing mode (reception mode).

A transducer TRDS included in a driving pixel D-PXL operated in the driving mode can generate ultrasonic waves, when a first driving signal DS is applied to a first driving electrode DE1, and a bias voltage GB corresponding to a second driving signal is applied to a second driving electrode DE2.

A transducer TRDS included in a sensing pixel S-PXL operated in the sensing mode can change a voltage of first driving electrode DE1 depending on ultrasonic waves reflected from a fingerprint after having been generated from the driving pixel D-PXL.

FIGS. 18 to 21 are diagrams illustrating examples of the local scan based fingerprint sensing process using results of touch sensing, in the complex sensing device 100 according to embodiments of the present disclosure.

The sensing controller S-CTR can determine (select) the location of a touch (e.g., one or more touch sensor units TSU based on first sensing data TSDATA outputted from the touch circuit T-CC.

The sensing controller S-CTR can set, as one or more fingerprint sensing areas FSA, one or more (PXL_F, PXL_G, PXL_J, PXL_K) of a plurality of pixels (PXL_A, PXL_B, PXL_C, PXL_D, . . . , PXL_M, PXL_N, PXL_O, PXL_P) on the fingerprint panel F-PNL, based on the determined touch location.

In other words, the sensing controller S-CTR can select one or more of a plurality of touch sensor units TSU based on the first sensing data TSDATA outputted from the touch circuit T-CC.

The plurality of pixels (PXL_A, PXL_B, PXL_C, PXL_D, . . . , PXL_M, PXL_N, PXL_O, PXL_P) on the fingerprint panel F-PNL can correspond to a plurality of fingerprint sensor units FSU.

Accordingly, the sensing controller S-CTR can select one or more touch sensor units TSU selected among the plurality of fingerprint sensor units FSU.

The sensing controller S-CTR can select one or more fingerprint sensor units FSU that overlap at least a part of an area over which the one or more selected touch sensor units TSU are spread.

The sensing controller S-CTR can set a fingerprint sensing area FSA including the one or more selected fingerprint sensor units FSU.

Figure 18:
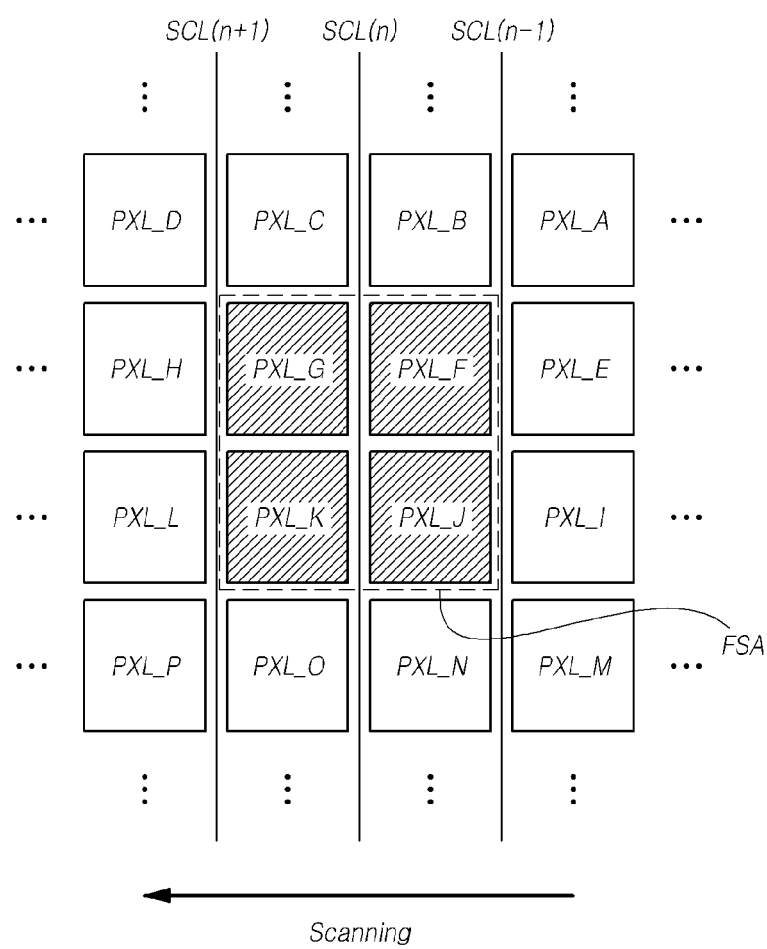
FIGS. 18, 19, 20, and 21 are diagrams illustrating examples of the local scan based fingerprint sensing process using results of touch sensing, in the complex sensing device according to embodiments of the present disclosure.

FIG. 18 shows that the sensing controller S-CTR selects four fingerprint sensor units FSU corresponding to four pixels (PXL_F, PXL_G, PXL_J, PXL_K), and the set fingerprint sensing area FSA is areas in which the four pixels (PXL_F, PXL_G, PXL_J, PXL_K) are disposed.

The sensing controller S-CTR can control scanning and driving (supplying a signal) for enabling the fingerprint circuit F-CC to sense a fingerprint sensing area FSA within the fingerprint panel F-PNL according to the setting of the fingerprint sensing area FSA.

Figure 19:
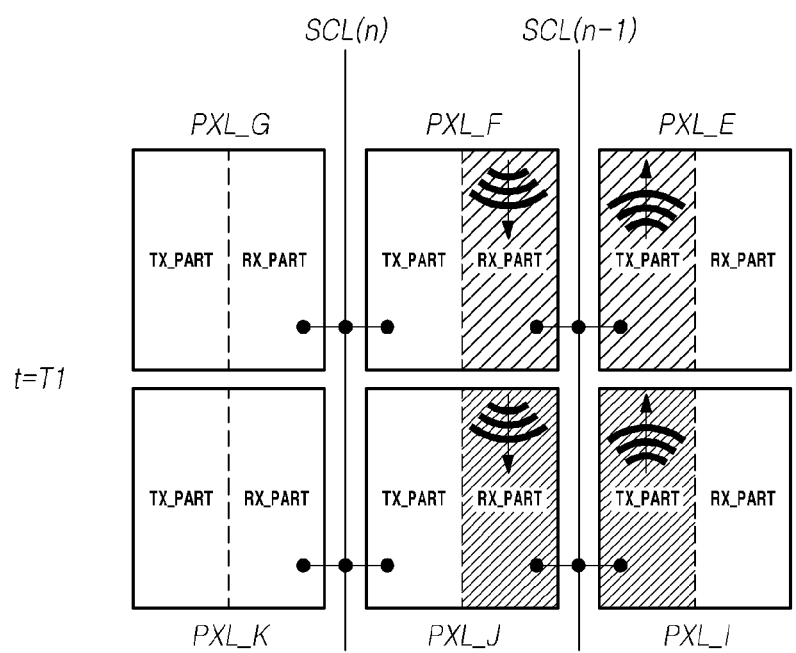
Figure 20:
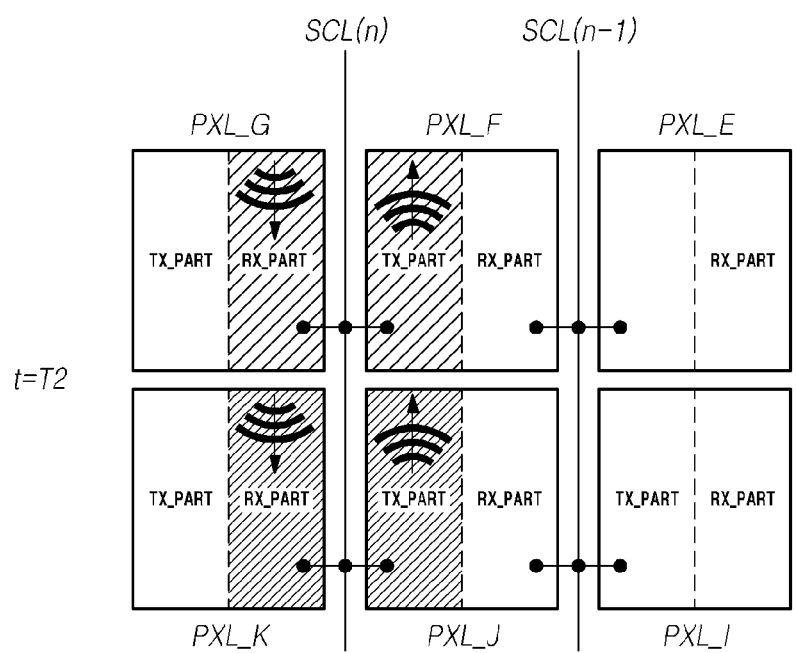
Figure 21:
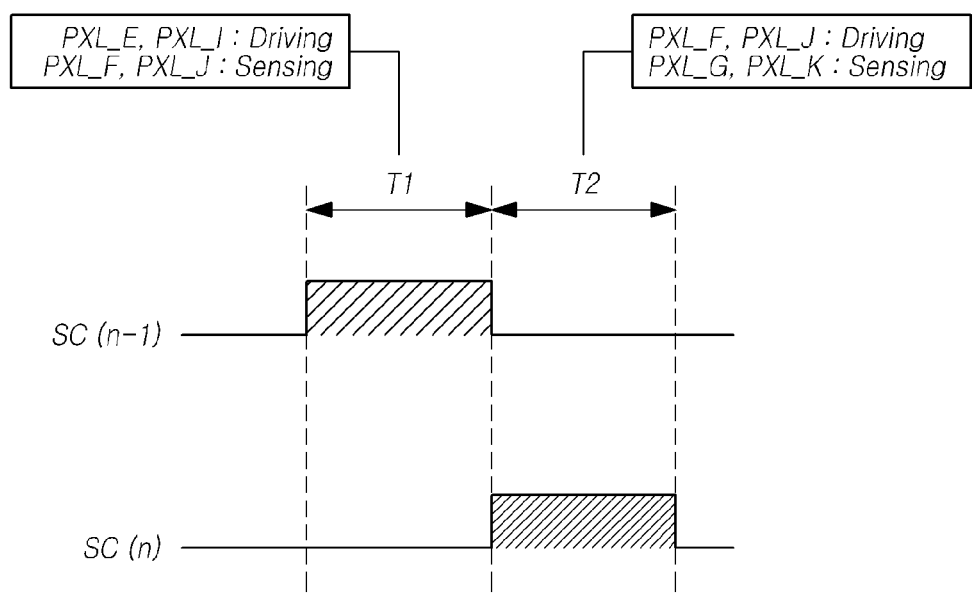

Referring to FIGS. 19 to 21, the four pixels (PXL_F, PXL_G, PXL_J, PXL_K) included in the fingerprint sensing area FSA can be sensed while a first interval (t=T1) and a second interval (t=T2) run.

Referring to FIGS. 19 and 21, during the first interval (T1), a driving pixel D-PXL is PXL_E and PXL_I, and a sensing pixel S-PXL is PXL_F and PXL_J.

In the first interval (T1), the sensing controller S-CTR selects, as the sensing pixel S-PXL, one or more (PXL_F, PXL_J) of the four pixels (PXL_F, PXL_G, PXL_J, PXL_K) included in the fingerprint sensing area FSA, and selects, as the driving pixel D-PXL, one or more pixels (PXL_E, PXL_I) adjacent to the sensing pixel S-PXL.

During the first interval (T1), the fingerprint circuit F-CC outputs an (n−1)th scan signal SC(n−1) with a turn-on level voltage through an (n−1)th scan line SCL(n−1).

The (n−1)th scan signal SC(n−1) with the turn-on level voltage can be applied to the gate node of an transmission transistor TXT included in each of the pixels (PXL_E, PXL_I) corresponding to the driving pixel D-PXL, and at the same time, be applied to the gate node of a second reception transistor RXT2 included in each of the pixels (PXL_F, PXL_J) corresponding to the sensing pixel S-PXL.

During the first interval (T1), in each of the pixels (PXL_E, PXL_I) corresponding to the driving pixel D-PXL, a first driving signal DS can be applied to a first driving electrode DE of a transducer TRDS through the turned-on transmission transistor TXT. That is, during the first interval (T1), the fingerprint circuit F-CC can supply the first driving signal DS to the pixels (PXL_E, PXL_I) corresponding to the driving pixel D-PXL.

Thus, as the first driving signal DS is supplied to the pixels (PXL_E, PXL_I) corresponding to the driving pixel D-PXL, the piezoelectric material layer PIEZO of the transducer TRDS of each of the pixels (PXL_E, PXL_I) corresponding to the driving pixel D-PXL vibrates, and then ultrasonic waves can be generated from the pixels (PXL_E, PXL_I) corresponding to the driving pixel D-PXL.

During the first interval (T1), the pixels (PXL_F, PXL_J) corresponding to the sensing pixel S-PXL can receive ultrasonic waves reflected from a fingerprint after having been generated from the pixels (PXL_E, PXL_I) corresponding to the driving pixel D-PXL, Thus, the piezoelectric material layer PIEZO of the transducer TRDS of each of the pixels (PXL_F, PXL_J) corresponding to the sensing pixel S-PXL vibrates, and there can therefore occur a change in voltages on the first driving electrodes DE1 in the pixels (PXL_F, PXL_J) corresponding to the sensing pixel S-PXL.

During the first interval (T1), the first and second reception transistors RXT1 and RXT2 of each of the pixels (PXL_F, PXL_J) corresponding to the sensing pixel S-PXL become turned on, and the fingerprint circuit F-CC can sense the pixels (PXL_F, PXL_J) corresponding to the sensing pixel S-PXL through the readout line RL.

Referring to FIGS. 20 and 21, during the second interval (T2), a driving pixel D-PXL is PXL_F and PXL_J, and a sensing pixel S-PXL is PXL_G and PXL_K.

In the second interval (T2), the sensing controller S-CTR selects, as the sensing pixel S-PXL, one or more (PXL_G, PXL_K) of the four pixels (PXL_F, PXL_G, PXL_J, PXL_K) included in the fingerprint sensing area FSA, and selects, as the driving pixel D-PXL, one or more pixels (PXL_F, PXL_J) adjacent to the sensing pixel S-PXL.

During the second interval (T2), the fingerprint circuit F-CC outputs an n-th scan signal SC(n) with a turn-on level voltage through an n-th scan line SCL(n).

The n-th scan signal SC(n) with the turn-on level voltage can be applied to the gate node of an transmission transistor TXT included in each of the pixels (PXL_F, PXL_J) corresponding to the driving pixel D-PXL, and at the same time, be applied to the gate node of a second reception transistor RXT2 included in each of the pixels (PXL_G, PXL_K) corresponding to the sensing pixel S-PXL.

During the second interval (T2), in each of the pixels (PXL_F, PXL_J) corresponding to the driving pixel D-PXL, a first driving signal DS can be applied to a first driving electrode DE of a transducer TRDS through the turned-on transmission transistor TXT. That is, during the second interval (T2), the fingerprint circuit F-CC can supply the first driving signal DS to the pixels (PXL_F, PXL_J) corresponding to the driving pixel D-PXL.

Thus, as the first driving signal DS is supplied to the pixels (PXL_F, PXL_J) corresponding to the driving pixel D-PXL, the piezoelectric material layer PIEZO of the transducer TRDS of each of the pixels (PXL_F, PXL_J) corresponding to the driving pixel D-PXL vibrates, and then ultrasonic waves can be generated from the pixels (PXL_F, PXL_J) corresponding to the driving pixel D-PXL.

During the second interval (T2), the pixels (PXL_G, PXL_K) corresponding to the sensing pixel S-PXL can receive ultrasonic waves reflected from a fingerprint after having been generated from the pixels (PXL_F, PXL_J) corresponding to the driving pixel D-PXL, Thus, the piezoelectric material layer PIEZO of the transducer TRDS of each of the pixels (PXL_G, PXL_K) corresponding to the sensing pixel S-PXL vibrates, and there can therefore occur a change in a voltage on the first driving electrodes DE1 in the pixels (PXL_G, PXL_K) corresponding to the sensing pixel S-PXL vibrates.

During the second interval (T2), the first and second reception transistors RXT1 and RXT2 of each of the pixels (PXL_G, PXL_K) corresponding to the sensing pixel S-PXL become turned on, and the fingerprint circuit F-CC can sense the pixels (PXL_G, PXL_K) corresponding to the sensing pixel S-PXL through the readout line RL.

As described above, it is possible to scan and sense only the pixels (PXL_F, PXL_G, PXL_J, PXL_K) included in the fingerprint sensing areas FSA, of the pixels (PXL_A, PXL_B, PXL_C, PXL_D, . . . , PXL_M, PXL_N, PXL_O, PXL_P) on the fingerprint panel F-PNL.

Only both the pixels (PXL_F, PXL_G, PXL_J, PXL_K) included in the fingerprint sensing areas FSA, of the pixels (PXL_A, PXL_B, PXL_C, PXL_D, . . . , PXL_M, PXL_N, PXL_O, PXL_P) on the fingerprint panel F-PNL and adjacent pixels (PXL_E, PXL_I) for sensing such pixels (PXL_F, PXL_G, PXL_J, PXL_K) are operated in the driving mode, and the remaining pixels (PXL_A, PXL_B, PXL_C, PXL_D, PXL_H, PXL_L, PXL_M, PXL_N, PXL_O, PXL_P, . . . ) are not operated (driven) in the driving mode or the sensing mode.

That is, the first driving signal DS can be supplied to only the pixels (PXL_F, PXL_G, PXL_J, PXL_K) included in the fingerprint sensing areas FSA, of the pixels (PXL_A, PXL_B, PXL_C, PXL_D, . . . , PXL_M, PXL_N, PXL_O, PXL_P) of the fingerprint panel F-PNL and the adjacent pixels (PXL_E, PXL_I) for sensing such pixels (PXL_F, PXL_G, PXL_J, PXL_K).

In other words, according to the local scan based fingerprint sensing process, rather than driving the whole area of the fingerprint panel F-PNL, driven is only an area (an FSA, or a part of the FSA and an area adjacent to the FSA). Thus, driving using the first driving signal DS with a high voltage level is limited to one or more areas, and it is therefore possible to reduce considerably power consumption. According to the embodiments described above, it is possible to provide significant advantages for battery operated portable electronic devices and for implementing large area sensors.

Figure 22:
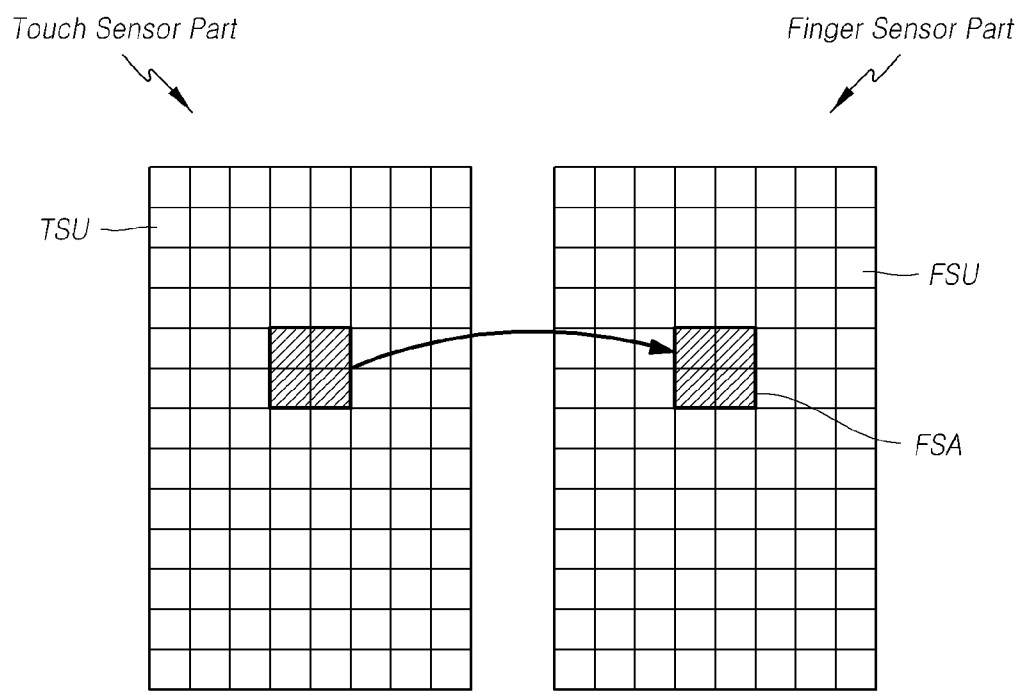
FIGS. 22, 23, and 24 are diagrams illustrating a size relationship between a touch sensor unit and a fingerprint sensor unit in the complex sensing device according to embodiments of the present disclosure.
Figure 23:
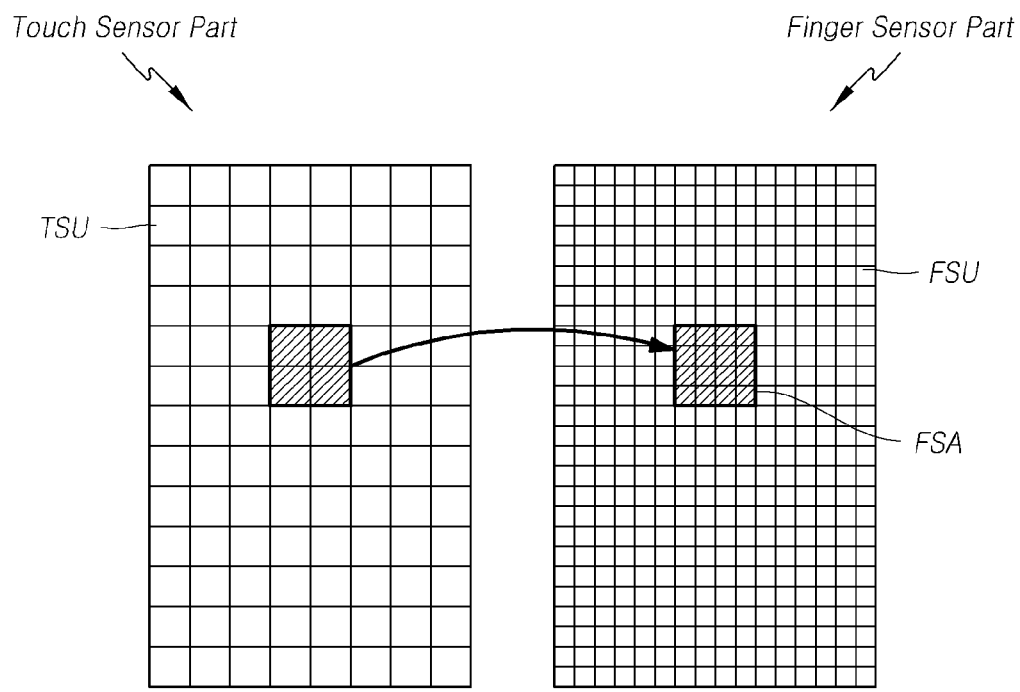

FIGS. 22 and 23 are diagrams illustrating a size relationship between a touch sensor unit TSU and a fingerprint sensor unit FSU in the complex sensing device 100 according to embodiments of the present disclosure.

FIGS. 22 to 23 shows a fingerprint panel F-PNL and a touch panel T-PNL in correspondence with each other.

A part of the touch panel T-PNL corresponding to the fingerprint panel F-PNL (hereinafter, referred to as "touch sensor part") may be the whole or a part of the touch panel T-PNL. On the contrary, a part of the fingerprint panel F-PNL corresponding to the touch panel T-PNL (hereinafter, referred to as "fingerprint sensor part") may be the whole or a part of the touch panel F-PNL.

Referring to FIG. 22, in the complex sensing device 100 in accordance with embodiments of the present disclosure, a size of one touch sensor unit TSU in the touch sensor part of the touch panel T-PNL may be corresponded, equal, or similar to that of one fingerprint sensor unit FSU in the fingerprint sensor part of the fingerprint panel F-PNL. In other words, the size of each of the plurality of touch sensor units TSU can corresponded to the size of each of the plurality of fingerprint sensor units FSU.

FIG. 22 shows that four touch sensor units TSU correspond to four fingerprint sensor units FSU.

A size of an area over which the four touch sensor units TSU are spread corresponds to a size of a fingerprint sensing area FSA corresponding to the four fingerprint sensor units FSU.

A location of the area over which the four touch sensor units TSU are spread corresponds to a location of the fingerprint sensing area FSA corresponding to the four fingerprint sensor units FSU.

FIG. 23 shows the touch sensor part and the fingerprint sensor part in the complex sensing device 100, when a size of a touch sensor unit TSU is larger than that of a fingerprint sensor unit FSU.

Referring to FIG. 23, in the complex sensing device 100, a size of one touch sensor unit TSU in the touch sensor part of the touch panel T-PNL may be larger than that of one fingerprint sensor unit FSU in the fingerprint sensor part of the fingerprint panel F-PNL. In other words, the size of each of the plurality of touch sensor units TSU can be larger than that of each of the plurality of fingerprint sensor units FSU.

FIG. 23 shows that four touch sensor units TSU correspond to 16 fingerprint sensor units FSU. A size of an area over which the four touch sensor units TSU are spread corresponds to that of a fingerprint sensing area FSA corresponding to the 16 fingerprint sensor units FSU. A location of the area over which the four touch sensor units TSU are spread corresponds to that of the fingerprint sensing area FSA corresponding to the 16 fingerprint sensor units FSU.

Figure 24:
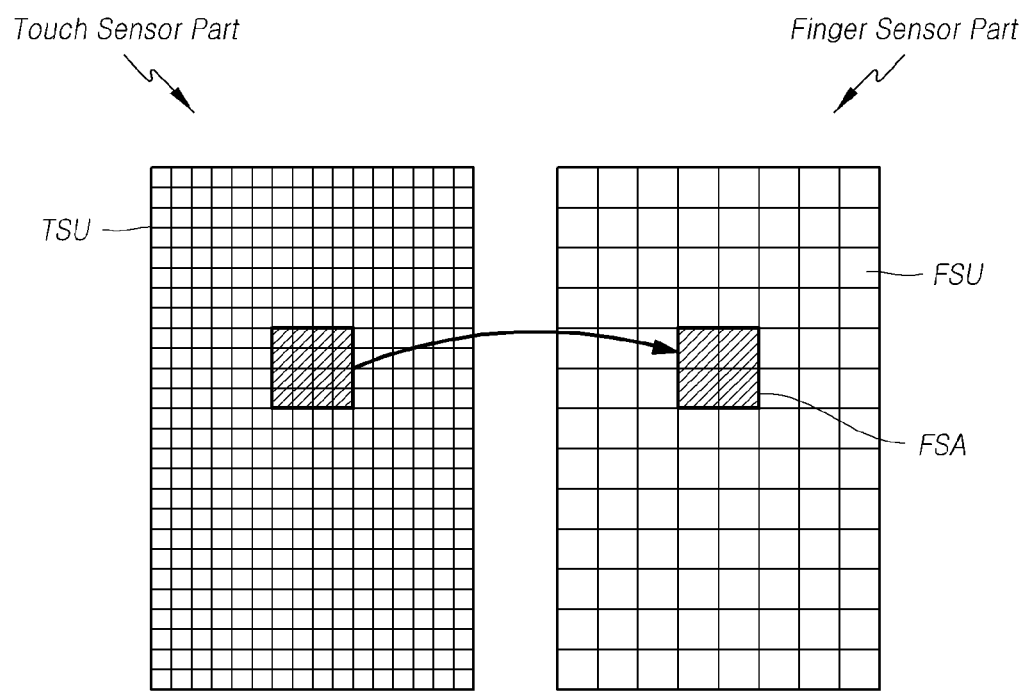

Referring to FIG. 24, in the complex sensing device 100, a size of one touch sensor unit TSU in the touch sensor part of the touch panel T-PNL may be smaller than that of one fingerprint sensor unit FSU in the fingerprint sensor part of the fingerprint panel F-PNL. In other words, the size of each of the plurality of touch sensor units TSU can be smaller than that of each of the plurality of fingerprint sensor units FSU.

FIG. 24 shows that 16 touch sensor units TSU correspond to 4 fingerprint sensor units FSU. A size of an area over which the 16 touch sensor units TSU are spread corresponds to that of a fingerprint sensing area FSA corresponding to the 4 fingerprint sensor units FSU. A location of the area over which the 16 touch sensor units TSU are spread corresponds to that of the fingerprint sensing area FSA corresponding to the 4 fingerprint sensor units FSU.

Figure 25:
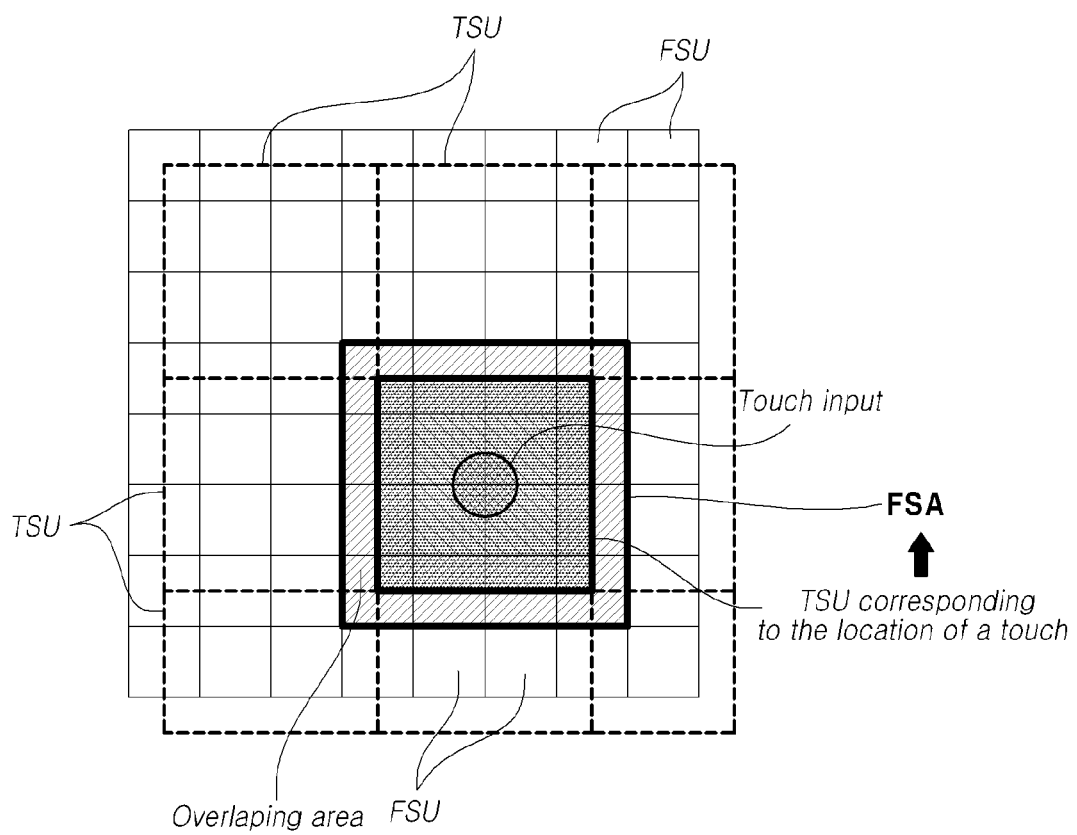
FIGS. 25 and 26 are diagrams illustrating the local scan based fingerprint sensing process when a location of one or more touch sensor units of the touch panel and a location of one or more fingerprint sensor units of the fingerprint panel do not match each other, in the complex sensing device according to embodiments of the present disclosure.
Figure 26:
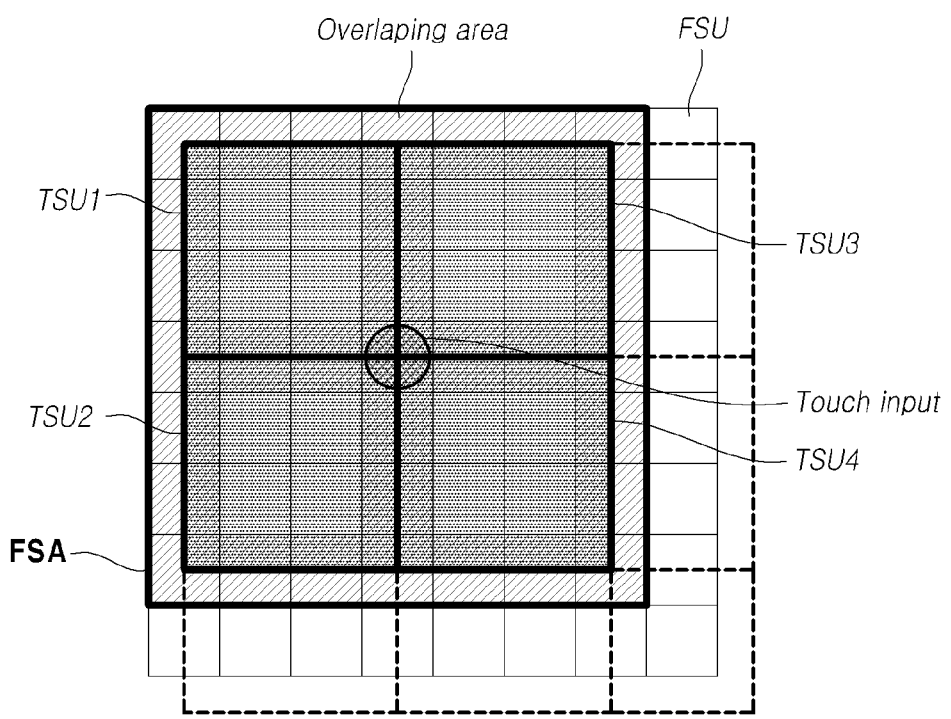

FIGS. 25 and 26 are diagrams illustrating the local scan based fingerprint sensing process when a location of one or more touch sensor units TSU of the touch panel T-PNL and a location of one or more fingerprint sensor units FSU of the fingerprint panel F-PNL do not match each other, in the complex sensing device 100 according to embodiments of the present disclosure.

In FIGS. 25 and 26, a plurality of touch sensor units TSU is represented as large boxes in dotted lines, and a plurality of fingerprint sensor units FSU is represented as small boxes in solid lines.

Referring to FIG. 25, in the complex sensing device 100 according to embodiments of the present disclosure, in a situation where a size of a touch sensor unit TSU is larger than that of a fingerprint sensor unit FSU, when a touch is input within an area of one touch sensor unit TSU, the sensing controller S-CTR selects one or more, which correspond to the location of the touch, of the plurality of touch sensor units TSU based on first sensing data TSDATA generated through driving and sensing operations of the touch circuit T-CC.

Further, the sensing controller S-CTR selects one or more fingerprint sensor units FSU, which overlap at least a part of an area over which the one or more selected touch sensor units TSU are spread, among the plurality of fingerprint sensor units FSU, and sets a fingerprint sensing area FSA including the one or more selected fingerprint sensor units FSU.

In FIG. 25, one touch sensor unit TSU corresponding to the touch location is selected, and 16 fingerprint sensor units FSU overlapping at least a part of the one selected touch sensor unit TSU are selected. In addition, set is a fingerprint sensing area including the 16 selected fingerprint sensor units FSU.

Referring to FIG. 25, since the size of the touch sensor unit TSU is larger than that of the fingerprint sensor unit FSU, and the location of an area over which the touch sensor unit TSU is spread is not physically matched to the location of an area over which the 16 fingerprint sensor units FSU are spread, fingerprint sensor units FSU overlapping the border of the touch sensor unit TSU can be processed as the overlapping area included in the fingerprint sensing area FSA even when the fingerprint sensor units FSU overlapping the border of the touch sensor unit TSU are selected by one or more other touch sensor units TSU.

FIG. 26 is a diagram illustrating the local scan based fingerprint sensing process, in a situation where a size of a touch sensor unit TSU is larger that of a fingerprint sensor unit FSU, when a touch spread over four touch sensor units (TSU1, TSU2, TUS3, and TUS4) is input, in the complex sensing device 100 in accordance with embodiments of the present disclosure.

Referring to FIG. 26, in the complex sensing device 100, in a situation where a size of a touch sensor unit TSU is larger than that of a fingerprint sensor unit FSU, when a touch overlapping four touch sensor units (TSU1, TSU2, TUS3, and TUS4) is input, the sensing controller S-CTR selects the four touch sensor units (TSU1, TSU2, TUS3, and TUS4), which correspond to the location of touch, of the plurality of touch sensor units TSU based on first sensing data TSDATA generated through driving and sensing operations of the touch circuit T-CC.

Further, the sensing controller S-CTR selects 49 fingerprint sensor units FSU overlapping at least a part of an area over which the selected four touch sensor units (TSU1, TSU2, TUS3, and TUS4) are spread, among the plurality of fingerprint sensor units FSU, and sets a fingerprint sensing area FSA including the selected 49 fingerprint sensor units FSU.

Referring to FIG. 26, since the size of the touch sensor unit TSU is larger than that of the fingerprint sensor unit FSU, and the location of an area over which the four touch sensor unit (TSU1, TSU2, TUS3, TUS4) is spread is not physically matched to the location of an area over which the 49 fingerprint sensor units FSU are spread, fingerprint sensor units FSU overlapping the outer border of the four touch sensor unit (TSU1, TSU2, TUS3, TUS4) can be processed as the overlapping area included in the fingerprint sensing area FSA even when the fingerprint sensor units FSU overlapping the outer border of the four touch sensor unit (TSU1, TSU2, TUS3, TUS4) are selected by one or more other touch sensor units TSU.

Figure 27:
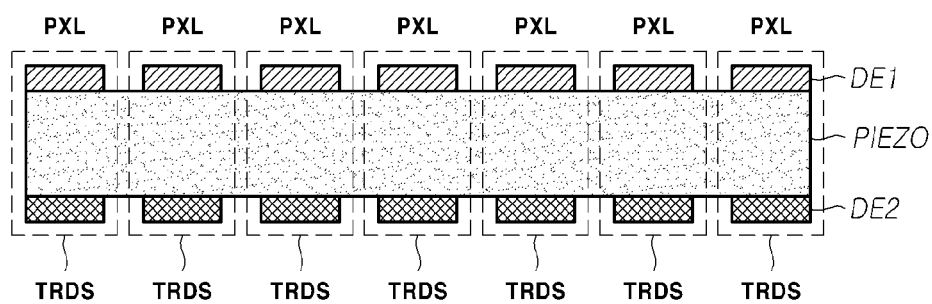
FIGS. 27, 28, and 29 are diagrams illustrating a transducer in each pixel in the fingerprint panel for enabling the complex sensing device efficiently to perform a local scan based fingerprint sensing process according to embodiments of the present disclosure.
Figure 29:
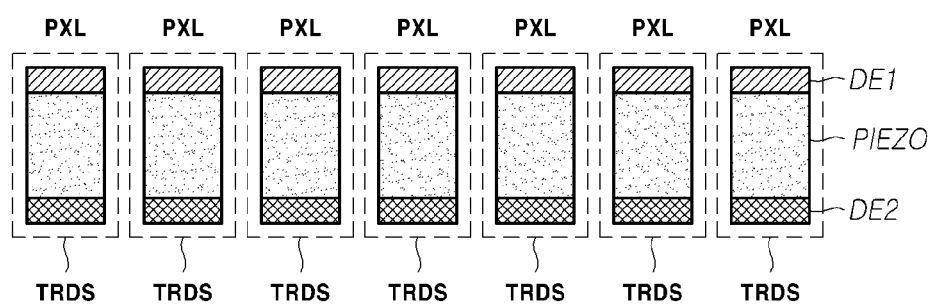

FIGS. 27 and 29 are diagrams illustrating a transducer in each pixel PXL in the fingerprint panel F-PNL for enabling the complex sensing device 100 efficiently to perform the local scan based fingerprint sensing process according to embodiments of the present disclosure.

Figure 28:
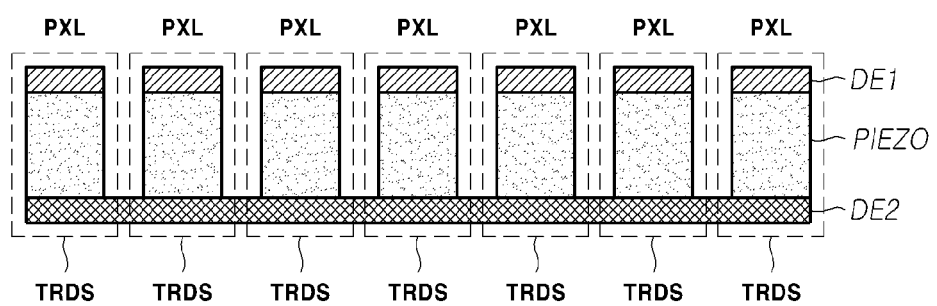

Referring to FIGS. 27 to 29, each pixel PXL includes a transducer TRDS, and the transducer TRDS includes a first driving electrode DE1, a piezoelectric material layer PIEZO, and a second driving electrode DE2.

As shown in FIG. 27, in the fingerprint panel F-PNL, the piezoelectric material layer PIEZO can be in the form of a plate, and be disposed commonly in the whole area of a plurality of pixels.

Alternatively, as shown in FIGS. 28 and 29, in the fingerprint panel F-PNL, the piezoelectric material layer PIEZO can be divided into portions corresponding to sizes of respective areas of the plurality of pixels, and the divided portions can be disposed in respective areas of the plurality of pixels. That is, the piezoelectric material layer PIEZO can be configured to be spread over the whole area of the pixels, or be divided into several portions and then the divided portions can be disposed in respective pixel areas.

Such a structure may be more suitable for a partial sensing scheme of sensing only one or more of pixels PXL to be sensed included in the corresponding pixel column.

As shown in FIG. 28, the second driving electrode DE2 can be in the form of a plate, and be disposed commonly in the whole area of the plurality of pixels.

Alternatively, as shown in FIGS. 27 and 29, the second driving electrode DE2 can be divided into portions corresponding to sizes of respective areas of the plurality of pixels, and the divided portions can be disposed in respective areas of the plurality of pixels. In other words, the second driving electrode DE2 can be configured to be spread over the whole area of the pixels, or be divided into several portions and then the divided portions may be disposed in respective pixel areas.

Such a structure may be more suitable for a partial sensing scheme of sensing only one or more of pixels PXL to be sensed included in the corresponding pixel column. When the partial sensing scheme is used, it is possible to reduce power consumption.

Referring to FIGS. 27 and 29, at least two of divided portions of the piezoelectric material layer PIEZO, which correspond to sizes of respective areas of the plurality of pixels PXL, can be mapped to a fingerprint sensing area FSA In addition, referring to FIGS. 27 and 29, at least two of divided portions of the second driving electrode DE2, which correspond to sizes of respective areas of the plurality of pixels PXL, can be mapped to a fingerprint sensing area FSA FIGS. 30 to 33 are diagrams illustrating a traveling direction of a touch scan and a fingerprint scan of the complex sensing device 100 according to embodiments of the present disclosure.

In order to determine a traveling direction of a touch scan and a fingerprint scan, the complex sensing device 100 can take into account a difference in size between a touch sensor unit TSU and a fingerprint sensor unit FSU, a difference in corresponding location between a touch sensor unit TSU and a fingerprint sensor unit FSU, a speed of scanning a touch sensor unit TSU (referred to as a touch sensing rate, a touch report rate, etc.), a speed of scanning a fingerprint sensor unit FSU (referred to as a fingerprint sensing rate, a fingerprint report rate, etc.), a resolution of a touch sensor unit TSU, or a resolution of a fingerprint sensor unit FSU etc.

Figure 30:
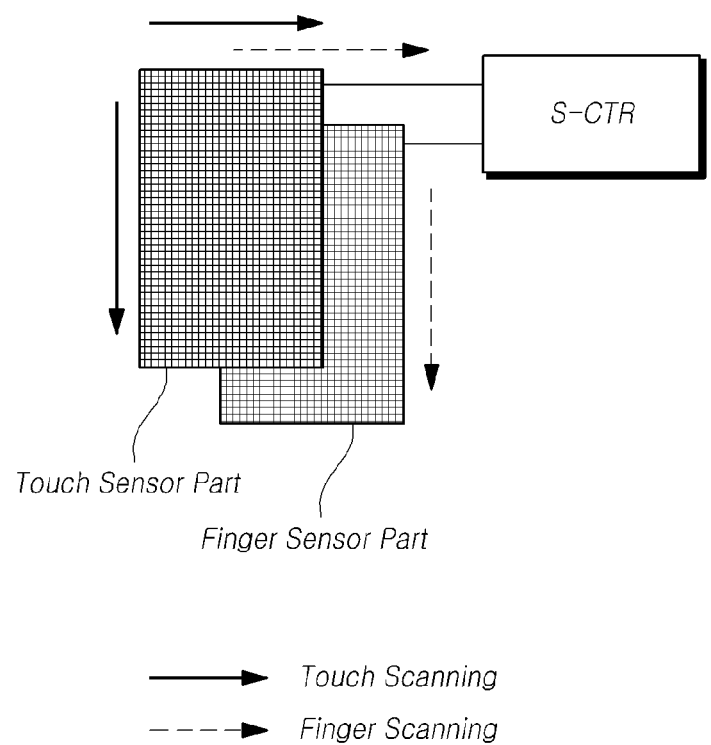
FIGS. 30, 31, 32, and 33 are diagrams illustrating a traveling direction of a touch scan and a fingerprint scan of the complex sensing device according to embodiments of the present disclosure.

Referring to FIG. 30, the direction of scanning a touch panel T-PNL can be equal to the direction of scanning a fingerprint sensing area in a fingerprint panel F-PNL.

More specifically, touch sensor units TSU included in one row of the touch panel T-PNL are scanned in a left to right direction, and then touch sensor units TSU included in a lower row than the scanned row are scanned in a left to right direction. Fingerprint sensor units FSU included in one row of the fingerprint panel F-PNL are scanned in a left to right direction, and then fingerprint sensor units FSU included in a lower row than the scanned row are scanned in a left to right direction.

Figure 31:
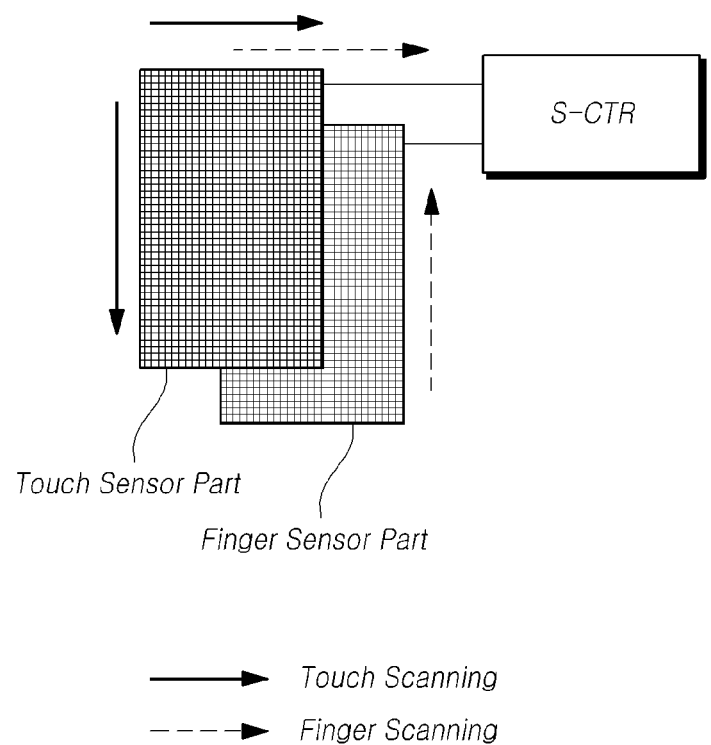
Figure 33:
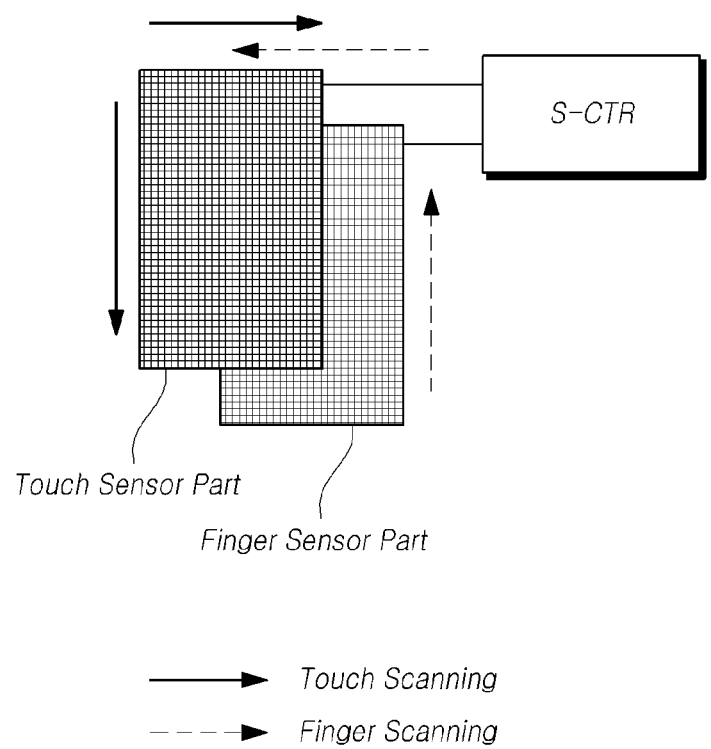

Referring to FIGS. 31 and 33, the direction of scanning a touch panel T-PNL can be different from that of scanning a fingerprint sensing area in a fingerprint panel F-PNL.

Referring to FIG. 31, touch sensor units TSU included in one row of the touch panel T-PNL are scanned in a left to right direction, and then touch sensor units TSU included in a lower row than the scanned row are scanned in a left to right direction. Fingerprint sensor units FSU included in one row of the fingerprint panel F-PNL are scanned in a left to right direction, and then fingerprint sensor units FSU included in an upper row that the scanned row are scanned in a left to right direction.

Figure 32:
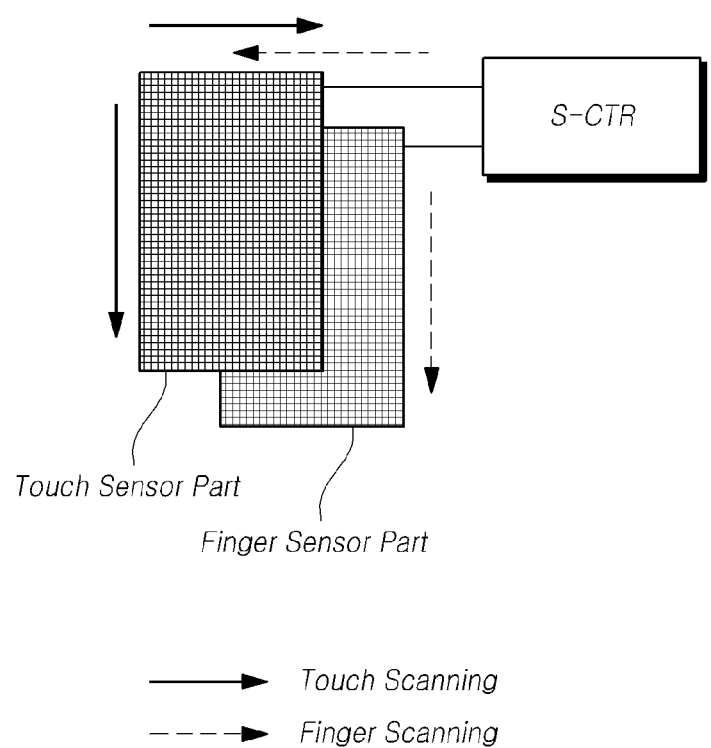

Referring to FIG. 32, touch sensor units TSU included in one row of the touch panel T-PNL are scanned in a left to right direction, and then touch sensor units TSU included in a lower row than the scanned row are scanned in a left to right direction. Fingerprint sensor units FSU included in one row of the fingerprint panel F-PNL are scanned in a right to left direction, and then fingerprint sensor units FSU included in a lower row than the scanned row are scanned in a right to left direction.

Referring to FIG. 33, touch sensor units TSU included in one row of the touch panel T-PNL are scanned in a left to right direction, and then touch sensor units TSU included in a lower row than the scanned row are scanned in a left to right direction. Fingerprint sensor units FSU included in one row of the fingerprint panel F-PNL are scanned in a right to left direction, and then fingerprint sensor units FSU included in an upper row than the scanned row are scanned in a right to left direction.

As described above, the complex sensing device 100 in accordance with embodiments of the present disclosure can be included in the display device. Here, the display device can be various electronic devices, such as, a mobile terminal, i.e., a smart phone, a tablet, or the like, a television of various sizes, a computer, a monitor, an information output device, or the like. Hereinafter, such a display device will be briefly discussed.

Figure 34:
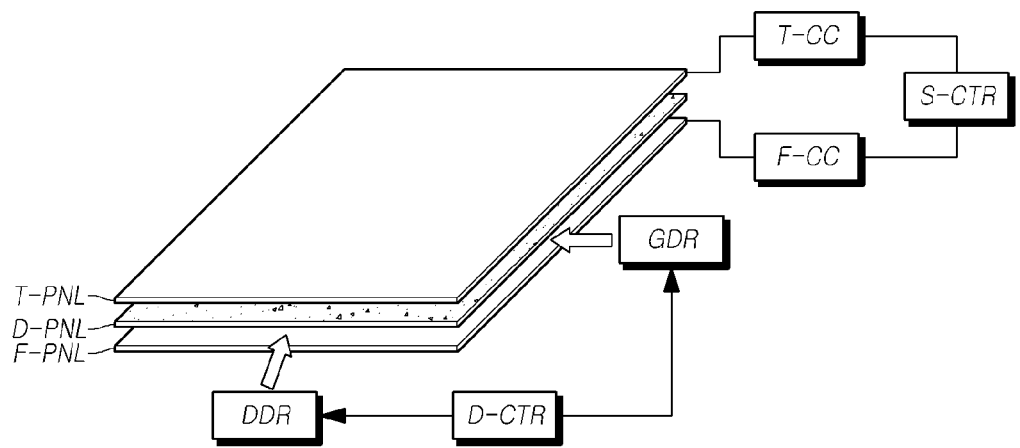
FIG. 34 is a diagram illustrating a display device including the complex sensing device according to embodiments of the present disclosure.

FIG. 34 is a diagram illustrating a display device 3400 including the complex sensing device 100 according to embodiments of the present disclosure.

Referring to FIG. 34, the display device 3400 in accordance with embodiments of the present disclosure can include components for displaying images and the complex sensing device 100.

Referring to FIG. 34, the display device 3400 can include, as the components for displaying images, a display panel D-PNL, and various types of display driving circuits for driving the display panel D-PNL.

The display panel D-PNL is a panel for displaying an image, and can include a plurality of data lines DL, a plurality of gate lines and a plurality of subpixels.

The display panel D-PNL may be various types of panel, such as, a liquid crystal display (LCD) panel, an organic light emitting diode (OLED) panel, or the like.

Types of signal line disposed in the display panel D-PNL may differ depending on a subpixel structure, a panel type (an LCD panel, an OLED panel, etc.), or the like. In addition, the signal line herein may include an electrode to which a signal is applied.

The display panel D-PNL can include an active area in which an image is displayed, and a non-active area which corresponds to an edge area of the display panel D-PNL and in which an image is not displayed.

The plurality of subpixels SP is arranged for displaying images in the active area.

A pad unit including one or more pads to which a data driver DDR is be electrically connected can be disposed in the non-active area, and a plurality of data link lines can be disposed to connect between the pad unit and each of the plurality of data lines DL. Here, the plurality of data link lines may be parts of the plurality of data lines DL extending to the non-active area, or may be separate patterns electrically connected to the plurality of data lines DL.

In addition, gate-driving-related lines can be disposed in the non-active area for delivering a voltage (signal) for driving at least one gate of at least one transistor for driving at least one subpixel to a gate driver GDR through the pad unit to which the data driver DDR is electrically connected. For example, the gate-driving-related lines may include a clock line for delivering clock signals, a gate voltage line for delivering gate voltages VGH and VGL, a gate driving control signal line for delivering various control signals for generating scan signals, or the like. The gate-driving-related lines are arranged in the non-active area, unlike the gate lines GL arranged in the active area A/A.

One or more display driving circuits can be used for driving the display panel D-PNL, and include the data driver DDR for driving the plurality of data lines DL, the gate driver GDR for driving the plurality of gate lines GL, the controller D-CTR controlling the display driver DDR and the gate driver GDR.

The data driver DDR can drive the plurality of data lines DL by providing data voltages to the plurality of data lines DL.

The gate driver GDR can drive the plurality of gate lines GL by providing scan signals to the plurality of gate lines GL.

The controller D-CTR can provide various control signals DCS and GCS for driving the data driver DDR and the gate driver GDR, and control driving operations of the data driver DDR and the gate driver GDR. In addition, the controller D-CTR can supply image data DATA to the data driver DDR.

The controller D-CTR starts scanning operation according to a timing processed in each frame, converts image data input from other devices or image providing sources to a data signal form used in the data driver DDR and then outputs image data DATA obtained from the converting, and controls the driving of at least one data line at a certain time according to the scanning of at least one pixel of one pixel row (or column).

The controller D-CTR generates various control signals DCS and GCS for controlling the data driver DDR and the gate driver GDR, and outputs the generated signals to the data driver DDR and the gate driver GDR.

For example, to control the gate driver GDR, the controller D-CTR outputs various gate control signals GCS including a gate start pulse GSP, a gate shift clock GSC, a gate output enable signal GOE, or the like.

In addition, to control data driver DDR, the controller D-CTR outputs various data control signals DCS including a source start pulse SSP, a source sampling clock SSC, a source output enable signal SOE, or the like.

The controller may be a timing controller used in the typical display technology or a control apparatus/device capable of additionally performing other control functionalities in addition to the typical function of the timing controller.

The controller D-CTR may be implemented as a separate unit from the data driver DDR, or integrated with the data driver DDR and implemented as an integrated circuit.

The data driver DDR receives image data DATA from the controller D-CTR, and provides data voltages to the plurality of data lines DL. Thus, the data driver DDR drives the plurality of data lines DL. Herein, the data driver DDR may also be referred to as a source driver.

The data driver DDR can transmit various signals to and/or receive them from the controller D-CTR through various interfaces.

The gate driver GDR sequentially drives the plurality of gate lines GL by sequentially providing scan signals to the plurality of gate lines GL. Herein, the gate driver GDR may also be referred to as a scan driver.

According to the control of the controller D-CTR, the gate driver circuit GDR sequentially provides a scan signal with a turn-on voltage level or a turn-off voltage level to the plurality of gate lines GL.

When a specific gate line is asserted by a scan signal from the gate driver GDR, the data driver DDR converts image data DATA received from the controller D-CTR into analog data voltages and provides the resulted analog data voltages to the plurality of data lines DL.

The data driver DDR may be located on, but not limited to, only one side (e.g., an upper side or a lower side) of the display panel D-PNL, or in some embodiments, be located on, but not limited to, two sides (e.g., an upper side and a lower side) of the display panel D-PNL according to driving schemes, panel design schemes, or the like.

The gate driver GDR may be located on, but not limited to, only one side (e.g., a left side or a right side) of the display panel D-PNL, or in some embodiments, be located on, but not limited to, two sides (e.g., a left side and a right side) of the display panel D-PNL according to driving schemes, panel design schemes, or the like.

The data driver DDR can be implemented by including one or more source driver integrated circuits SDIC.

Each source driver integrated circuits SDIC can include a shift register, a latch circuit, a digital to analog converter DAC, an output buffer, or the like. In some embodiments, the data driver DDR may further include one or more analog to digital converters ADC.

Each source driver integrated circuit SDIC can be connected to a pad, such as a bonding pad, of the display panel D-PNL in a tape automated bonding TAB type or a chip on glass (COG) type, or be directly disposed on the display panel D-PNL. In some embodiments, each source driver integrated circuit SDIC may be integrated and disposed on the panel display D-PNL. In addition, each source driver integrated circuit SDIC may be implemented in a chip on film (COF) type. In this case, each source driver integrated circuit SDIC can be mounted on a circuit film and electrically connected to the data lines DL of the display panel D-PNL through the circuit film.

The gate driver GDR can include a plurality gate driving circuits GDC. Here, the plurality of gate driving circuits GDC can correspond to the plurality of gate lines.

Each gate driving circuit GDC can include a shift register, a level shifter, and the like.

Each gate driving circuit GDC can be connected to the pad, such as a bonding pad, of the display panel D-PNL in a tape automated bonding (TAB) type or a chip on glass (COG) type. In addition, each gate driving circuit GDC may be implemented in a chip on film (COF) type. In this case, each gate driver integrated circuit SDIC can be mounted on a circuit film and electrically connected to the gate lines GL of the display panel D-PNL through the circuit film. In addition, each gate driving circuit GDC may be integrated into the display panel D-PNL in a gate in panel (GIP) type. That is, each gate driving circuit GDC may be directly formed in the display panel D-PNL.

Meanwhile, the complex sensing device 100 has been described above, and will be briefly discussed again.

The complex sensing device 100 can include a touch panel T-PNL including a plurality of touch electrodes TE, a fingerprint panel F-PNL including a plurality of pixels PXL, a touch circuit T-CC outputting first sensing data TSDATA by sensing the touch panel T-PNL, a fingerprint circuit F-CC outputting second sensing data FSDATA by sensing a fingerprint sensing area FSA on the fingerprint panel F-PNL, and a sensing controller S-CTR setting the fingerprint sensing area FSA for enabling the fingerprint circuit F-CC to sense the fingerprint panel F-PNL based on the first sensing data TSDATA of the touch circuit T-CC.

The sensing controller S-CTR can determine the location of a touch based on the first sensing data TSDATA, and set, as the fingerprint sensing area FSA, a part of the whole area of the fingerprint panel F-PNL based on the touch location.

One or more of a plurality of pixels PXL included in the fingerprint sensing area FSA can be selected as a sensing pixel S-PXL, and one or more pixels adjacent to the one or more pixels corresponding to the sensing pixel S-PXL can be selected as a driving pixel D-PXL, The fingerprint circuit F-CC can supply a first driving signal DS to the one or more pixels corresponding to the driving pixel D-PXL, and sense the one or more pixels corresponding to sensing pixels S-PXL.

The fingerprint circuit F-CC does not supply the first driving signal DS to one or more pixels that are not selected as the driving pixel D-PXL.

As the first driving signal DS is supplied to the one or more pixels corresponding to the driving pixel D-PXL, ultrasonic waves are generated from the one or more pixels corresponding to the driving pixel D-PXL, and then ultrasonic waves reflected from a fingerprint after having been generated from the one or more pixels corresponding to the driving pixel D-PXL can be received by the one or more pixels corresponding to sensing pixels S-PX.

In accordance with embodiments of the present disclosure, it is possible to perform fingerprint sensing with low power consumption.

In accordance with embodiments of the present disclosure, it is possible to perform fingerprint sensing in a large sensing area.

In accordance with embodiments of the present disclosure, it is possible to perform fingerprint sensing in various locations.

In accordance with embodiments of the present disclosure, it is possible to perform fingerprint sensing by locally scanning only a part of the whole areas of a fingerprint panel.

In accordance with embodiments of the present disclosure, it is possible to provide complex sensing devices, display devices and sensing methods for enabling a fingerprint sensor to sense a fingerprint with low power consumption using a touch sensor.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to one or more other additional embodiment embodiments by combining or modifying such features, structures, configurations, and effects. It should be understood that all such combinations and modifications are included within the scope of the present disclosure Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The scope of the present disclosure shall be construed on the basis of the accompanying claims in such a manner that all of the technical ideas included within the scope equivalent to the claims belong to the present disclosure.

What is claimed is:

1. A complex sensing device comprising:
   a touch panel including a plurality of touch electrodes;
   a fingerprint panel including a plurality of pixels;
   a touch circuit sensing the touch panel and outputting first sensing data;
   a fingerprint circuit sensing a fingerprint sensing area of the fingerprint panel and outputting second sensing data; and
   a sensing controller setting the fingerprint sensing area to sense the fingerprint panel based on the first sensing data of the touch circuit,
   wherein each of the plurality of pixels included in the fingerprint panel comprises:
   a transducer including a first driving electrode, a piezoelectric material layer, and a second driving electrode;
   a transmission transistor controlled by a first scan signal supplied through a first scan line, and electrically connected between a driving line to which a first driving signal is supplied and the first driving electrode; and
   a first reception transistor and a second reception transistor electrically connected between a readout line and a power supply line to which a power supply voltage is supplied,
   wherein the first reception transistor is electrically connected between the power supply line and an intermediate node corresponding to a connection point between the first reception transistor and the second reception transistor,
   wherein the second reception transistor is controlled according to a second scan signal supplied through a second scan line, and electrically connected between the intermediate node and the readout line,
   wherein the plurality of pixels include a first pixel, a second pixel, and a third pixel adjacent in a first direction,
   wherein the fingerprint panel further includes an (n−1)-th scan line disposed between the first pixel and the second pixel and an n-th scan line disposed between the second pixel and the third pixel,
   wherein the (n−1)-th scan line is electrically connected in common to a gate node of the transmission transistor of the first pixel and a gate node of the second reception transistor of the second pixel, and
   wherein the n-th scan line is electrically connected in common with a gate node of the transmission transistor of the second pixel and a gate node of the second reception transistor of the third pixel.

2. The complex sensing device according to claim 1, wherein the sensing controller determines a touch location based on the first sensing data, and
   sets a part of an area of the fingerprint panel as the fingerprint sensing area based on the touch location.

3. The complex sensing device according to claim 2, wherein one or more of the plurality of pixels included in the fingerprint sensing area are selected as a sensing pixel, and one or more pixels adjacent to the one or more pixels corresponding to the sensing pixel are selected as a driving pixel, and
   wherein the fingerprint circuit supplies the first driving signal to the one or more pixels corresponding to the driving pixel.

4. The complex sensing device according to claim 3, wherein as the driving signal is supplied to the one or more pixels corresponding to the driving pixel, the one or more pixels corresponding to the driving pixel generate ultrasonic waves, and ultrasonic waves reflected from a fingerprint after having been generated from the one or more pixels corresponding to the driving pixel are received by the one or more pixels corresponding to sensing pixels.

5. The complex sensing device according to claim 1, wherein the transducer included in the one or more pixels corresponding to the driving pixel generates ultrasonic waves when the first driving signal is applied to the first driving electrode and a bias voltage is applied to the second driving electrode, and the transducer included in the one or more pixels corresponding to the sensing pixel causes a voltage of the first driving electrode to be changed depending on ultrasonic waves reflected from a fingerprint after having been generated from the one or more pixels corresponding to the driving pixel.

6. The complex sensing device according to claim 1, wherein the piezoelectric material layer is in a form of a plate, and disposed commonly in an area of the plurality of pixels.

7. The complex sensing device according to claim 1, wherein the piezoelectric material layer is divided into portions corresponding to sizes of respective areas of the plurality of pixels.

8. The complex sensing device according to claim 7, wherein one or more of the divided portions corresponding to sizes of respective areas of the plurality of pixels are mapped to the fingerprint sensing area.

9. The complex sensing device according to claim 1, wherein a plurality of touch sensor units are defined by the plurality of touch electrodes, and a plurality of fingerprint sensor units correspond to the plurality of pixels,
wherein the sensing controller selects one or more of the plurality of touch sensor units based on the first sensing data, selects one or more of the plurality of fingerprint sensor units which overlap at least a part of an area of the one or more selected touch sensor units, and sets the fingerprint sensing area including the one or more selected fingerprint sensor units.

10. The complex sensing device according to claim 9, wherein a size of each of the plurality of touch sensor units corresponds to a size of each of the plurality of fingerprint sensor units.

11. The complex sensing device according to claim 9, wherein a size of each of the plurality of touch sensor units is larger than a size of each of the plurality of fingerprint sensor units.

12. The complex sensing device according to claim 9, wherein a size of each of the plurality of touch sensor units is smaller than a size of each of the plurality of fingerprint sensor units.

13. The complex sensing device according to claim 9, wherein the plurality of touch electrodes are touch electrodes for sensing a self-capacitance, and each of the plurality of touch sensor units corresponds to each of the plurality of touch electrodes.

14. The complex sensing device according to claim 9, wherein the plurality of touch electrodes includes one or more driving touch electrodes and one or more sensing touch electrodes for sensing a mutual capacitance, and each of the plurality of touch sensor units is defined in an area in which each of the driving touch electrodes and each of the sensing touch electrodes intersect.

15. The complex sensing device according to claim 1, wherein a direction in which the touch panel is scanned is a same direction in which the fingerprint sensing area is scanned in the fingerprint panel.

16. The complex sensing device according to claim 1, wherein a direction in which the touch panel is scanned is different from a direction in which the fingerprint sensing area is scanned in the fingerprint panel.

17. The complex sensing device according to claim 1, wherein the sensing controller sets two or more fingerprint sensing areas each having a different location from another based on the first sensing data of the touch circuit.

18. A display device comprising:
a display panel; and
the complex sensing device of claim 1.

19. A method of sensing a complex sensing device including a touch panel and a fingerprint panel, the method comprising:
sensing the touch panel;
setting a fingerprint sensing area corresponding to an area of the fingerprint panel based on a result obtained from the sensing of the touch panel; and
locally sensing the fingerprint sensing area of the fingerprint panel,
wherein each of a plurality of pixels included in the fingerprint panel comprises:
a transducer including a first driving electrode, a piezoelectric material layer, and a second driving electrode;
a transmission transistor controlled by a first scan signal supplied through a first scan line, and electrically connected between a driving line to which a first driving signal is supplied and the first driving electrode; and
a first reception transistor and a second reception transistor electrically connected between a readout line and a power supply line to which a power supply voltage is supplied,
wherein the first reception transistor is electrically connected between the power supply line and an intermediate node corresponding to a connection point between the first reception transistor and the second reception transistor,
wherein the second reception transistor is controlled according to a second scan signal supplied through a second scan line, and electrically connected between the intermediate node and the readout line,
wherein the plurality of pixels include a first pixel, a second pixel, and a third pixel adjacent in a first direction,
wherein the fingerprint panel further includes an (n−1)-th scan line disposed between the first pixel and the second pixel and an n-th scan line disposed between the second pixel and the third pixel,
wherein the (n−1)-th scan line is electrically connected in common to a gate node of the transmission transistor of the first pixel and a gate node of the second reception transistor of the second pixel, and
wherein the n-th scan line is electrically connected in common with a gate node of the transmission transistor of the second pixel and a gate node of the second reception transistor of the third pixel.

20. An apparatus comprising:
a touch panel including a plurality of touch electrodes defining an area of the touch panel;
a touch circuit configured to sense the touch panel;
a fingerprint panel including a plurality of pixels defining an area of the fingerprint panel, the area of the fingerprint panel overlapping the area of the touch panel; and
a fingerprint circuit configured to sense a subset of the plurality of the pixels of the fingerprint panel corresponding to a fingerprint sensing area that is smaller than the area of the fingerprint panel,
wherein each of the plurality of pixels included in the fingerprint panel comprises:
a transducer including a first driving electrode, a piezoelectric material layer, and a second driving electrode;
a transmission transistor controlled by a first scan signal supplied through a first scan line, and electrically connected between a driving line to which a driving signal is supplied and the first driving electrode; and
a first reception transistor and a second reception transistor electrically connected between a readout line and a power supply line to which a power supply voltage is supplied, wherein the first reception transistor is electrically connected between the power supply line and an intermediate node corresponding to a connection point between the first reception transistor and the second reception transistor, wherein the second reception transistor is controlled according to a second scan signal supplied through a second scan line, and electrically connected between the intermediate node and the readout line, wherein the plurality of pixels include a first pixel, a second pixel, and a third pixel adjacent in a first direction, wherein the fingerprint panel further includes an (n−1)-th scan line disposed between the first pixel and the second pixel and an n-th scan line disposed between the second pixel and the third pixel, wherein the (n−1)-th scan line is electrically connected in common to a gate node of the transmission transistor of the first pixel and a gate node of the second reception transistor of the second pixel, and wherein the n-th scan line is electrically connected in common with a gate node of the transmission transistor of the second pixel and a gate node of the second reception transistor of the third pixel.

21. The apparatus of claim 20, wherein the touch circuit is configured to output touch sensing data, and the fingerprint circuit is configured to provide the driving signal to a first pixel selected as a driving pixel in the fingerprint sensing area.

22. The apparatus of claim 21, wherein the fingerprint circuit is configured to provide the first scan signal to the first pixel in the fingerprint sensing area, the first pixel generating ultrasonic waves corresponding to the driving signal.

23. The apparatus of claim 22, wherein the fingerprint circuit is configured to provide the first scan signal to a second pixel selected as a sensing pixel in the fingerprint sensing area, the second pixel sensing ultrasonic waves that are the generated ultrasonic waves from the first pixel reflected from a fingerprint of a finger.

24. The apparatus of claim 20, further comprising:

a sensing controller electrically coupled to the touch circuit and the fingerprint circuit, the sensing controller configured to receive touch sensing data from the touch circuit, and configured to cause the fingerprint circuit to:

provide the driving signal to the first pixel in the fingerprint sensing area, and provide the first scan signal to both the first pixel and a second pixel in the fingerprint sensing area, the first pixel generating ultrasonic waves corresponding to the driving signal, and the second pixel sensing ultrasonic waves that are the generated ultrasonic waves from the first pixel reflected from a fingerprint of a finger.

* * * * *